United States Patent [19]

Gueldenpfennig et al.

[11] 3,806,660

[45] Apr. 23, 1974

[54] TRUNK CIRCUIT HAVING SELECTIVE INTERFACE COMBINATIONS

[75] Inventors: Klaus Gueldenpfennig, Penfield; Stanley L. Russell, West Webster, both of N.Y.

[73] Assignee: Stromberg-Carlson Corporation, Rochester, N.Y.

[22] Filed: Sept. 29, 1972

[21] Appl. No.: 293,571

[52] U.S. Cl. .............................................. 179/18 AH
[51] Int. Cl. .............................................. H04m 7/10
[58] Field of Search .................... 179/18 AH, 27 CB

[56] References Cited

UNITED STATES PATENTS 3,496,303 2/1970 Pharis ........................... 179/18 AH
2,843,672 7/1958 Gatzert ..................... 179/18 AH X

*Primary Examiner*—Thomas W. Brown
*Attorney, Agent, or Firm*—Donald R. Antonelli

[57] ABSTRACT

A trunk circuit for an automatic exchange which includes a plurality of possible interface terminations with the outside world, which interface terminations may be selected by simply effecting required terminal connections of the component parts thereof in a selective manner, such as by insertion of a connection card. The trunk circuit also provides all of the necessary features to be used as an incoming/outgoing trunk, an information trunk or an operator access trunk and therefore is universal in nature.

15 Claims, 17 Drawing Figures

TRUNK CIRCUIT HAVING SELECTIVE INTERFACE COMBINATIONS

Figure 1:
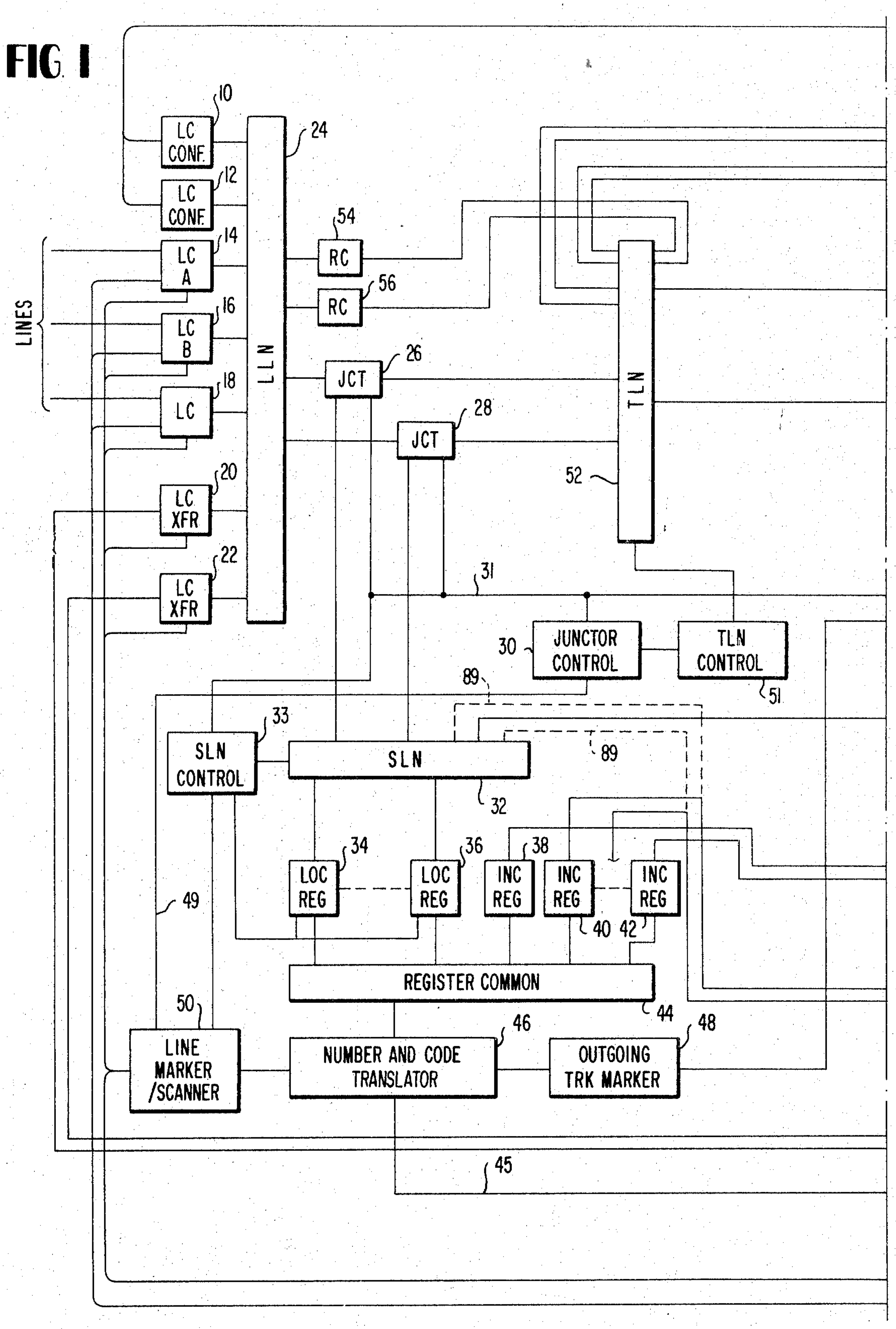

The present invention relates in general to telephone systems, and more particularly to trunk circuits which interface local telephone switching equipment within a private branch exchange with the outside world and provide connection to operator position circuits within the PBX telephone system.

Trunk circuits employed in a local telephone switching office to connect the local office telephone switching equipment with the outside world must be compatible with the type of circuits to which they are connected. To meet this requirement, various types of specific trunk circuits have been designed to interface with the various types of exchange systems presently in use in the various telephone systems throughout the country. As an example, outgoing trunks, loop and E and M types, incoming trunks, loop and E and M types, and two-way trunks, loop and E and M types, have been developed. An example of the numerous trunks which are needed to interface a single switching system with the various types of exchange systems is disclosed in copending application Ser. No. 202,788, filed Nov. 29, 1971, by George R. Bergquist and Matyas Hugyecz, now U.S. Pat. No. 3,763,321, entitled "Trunk Circuits for Electronic Telephone Systems", which is assigned to the same assignee as the present application.

The numerous types of trunk circuits being individually designed require telephone operating companies to maintain a large spare part inventory of different types of trunk circuits as replacements for the trunk circuits which become inoperative for one reason or another. Should one or more types of outside world trunk circuits be changed, then the local office trunk circuits interfacing with the changed trunk circuit must be modified or replaced to maintain the needed compatibility of the circuits. Obviously, this requirement is both costly and inconvenient.

As in all electronic control systems, the basic objectives in telephone system design include the design of circuits to perform numerous functions and to be compatible with all types of equipment to which the system is to be connected. Thus, in the case of trunk circuits, it is desirable to provide a single trunk circuit which is compatible with all of the different individual interfaces and different types of exchanges to which the system will be associated. In this regard, the trunk circuit may be connected at the distant exchange to a line circuit, another trunk, a selector or other equipment, and for this purpose it is preferable that the trunk circuit be capable of effecting such connection without complicated modification or special design.

In private branch exchange systems, such as the type disclosed in our copending application Ser. No. 293,518, filed Sept. 29, 1972, entitled "Private Automatic Branch Exchange", a number of trunk circuit operations can be provided by the system exchange. For example, the trunk circuit could provide for connection directly to an operator, it could be a trunk circuit going to a register, it could perform a one-way out-/one-way in function, it could be a trunk with a transfer function, it could be a trunk without a transfer function, etc. Ideally, it would be most advantageous to provide a single so-called universal trunk circuit which would be capable with at most slight modification to perform all of these functions so that a single trunk circuit need be manufactured and used for whatever trunk function is desired.

It is therefore an object of the present invention to provide a new and improved trunk circuit of the universal type which is capable of being interfaced with any type of outside world circuit.

Another object of this invention is to provide a trunk circuit arrangement which is capable of performing the multiple operations required by a large private automatic branch exchange.

A still further object of the present invention is to provide a telephone trunk circuit including a plurality of predetermined, readily changeable strapping circuits for programming the trunk circuit to perform prescribed functions.

A further object of the present invention is to provide a telephone trunk circuit which is sufficiently versatile to operate as an incoming/outgoing trunk, as well as an attendant trunk and access trunk, and which is capable of interfacing without modification and with substantially all telephone exchange equipment.

Figure 2:
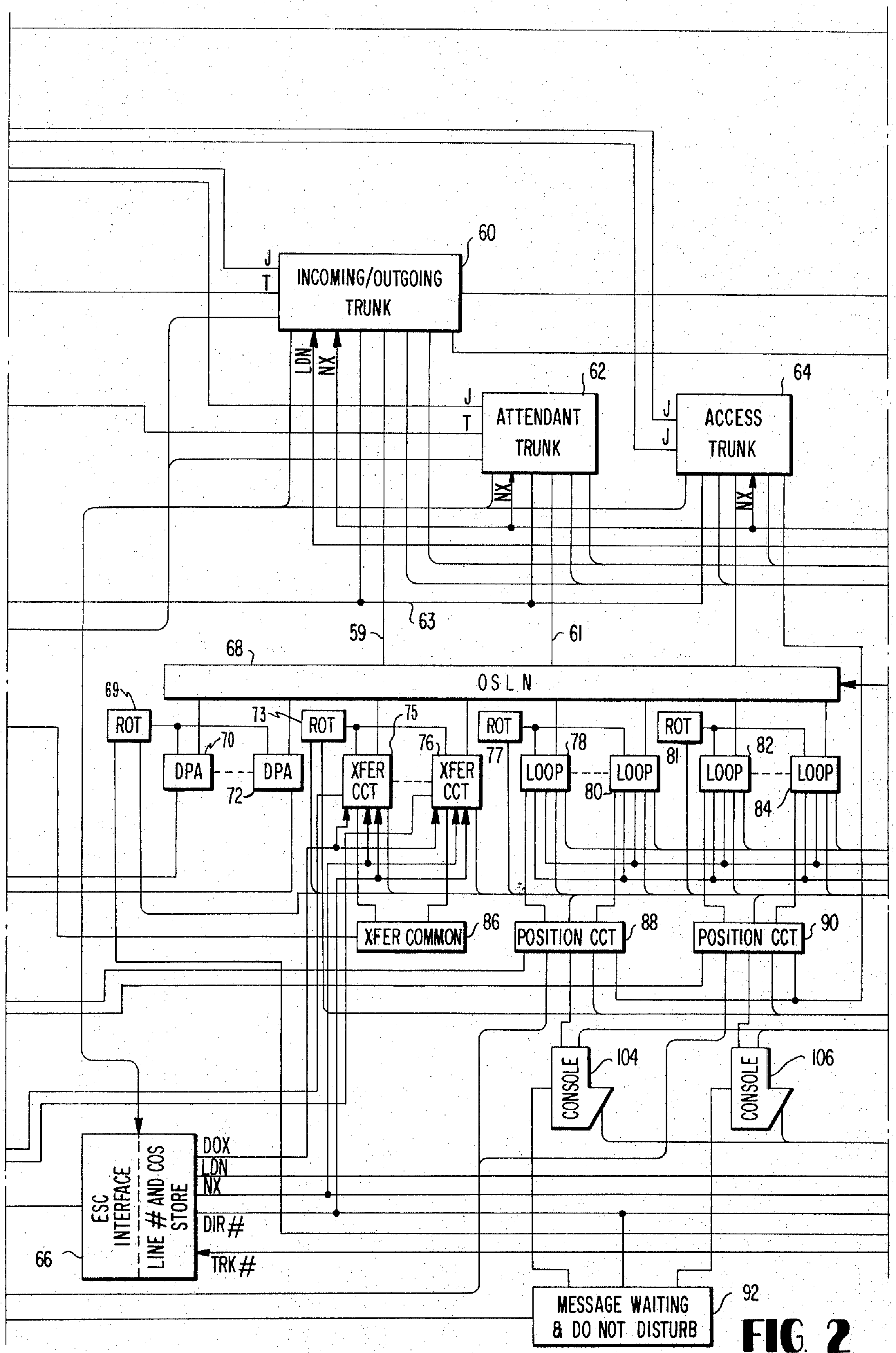
Figure 3:
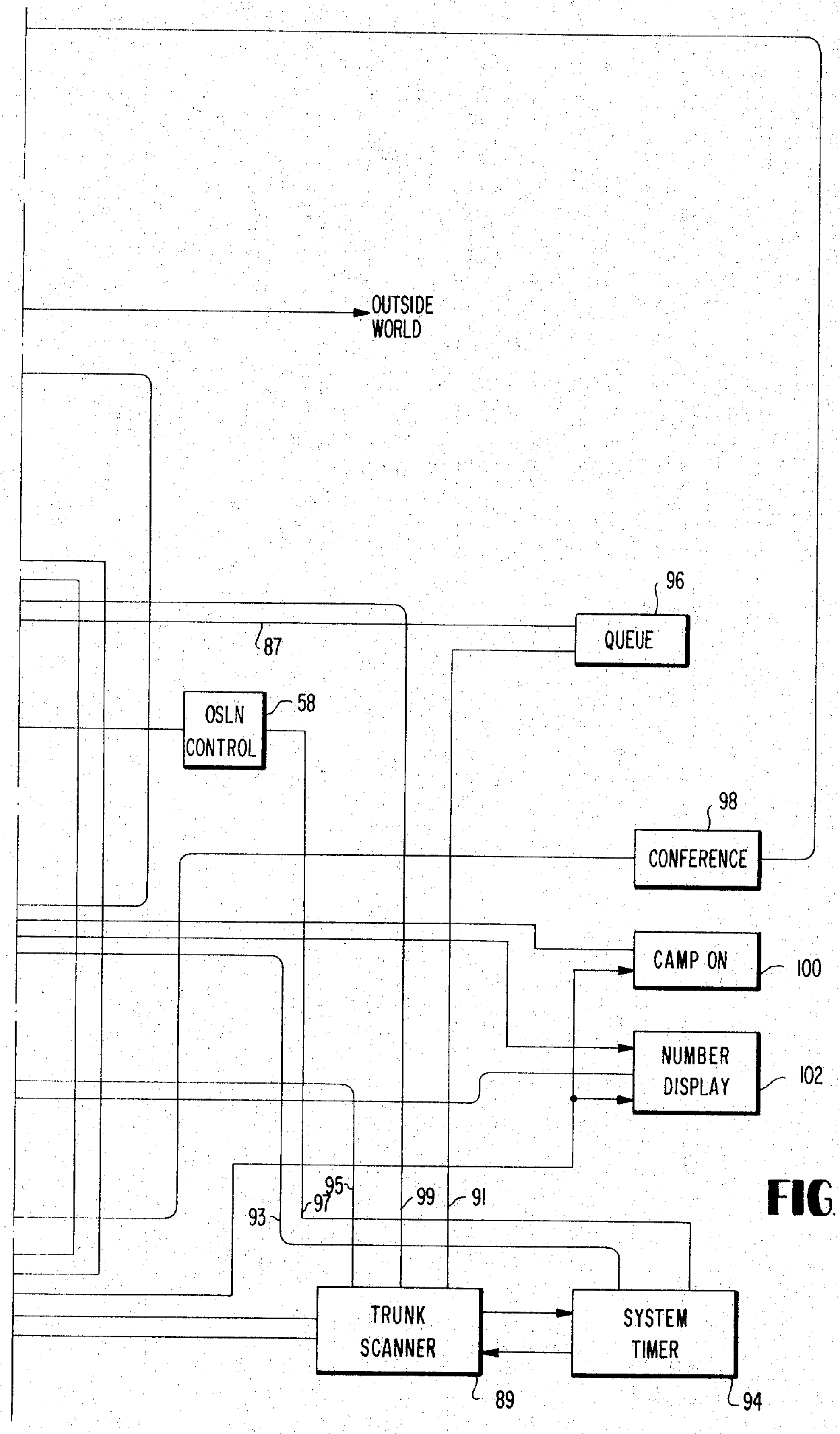

These and other objects, features, and advantages of the present invention will become more apparent from the following detailed description when taken in conjunction with the accompanying drawings, which illustrate one exemplary embodiment of the present invention, and wherein:

FIGS. 1–3 when combined in numerical order provide a schematic block diagram of a private automatic branch exchange including the trunk circuit of the invention.

Figure 4A:
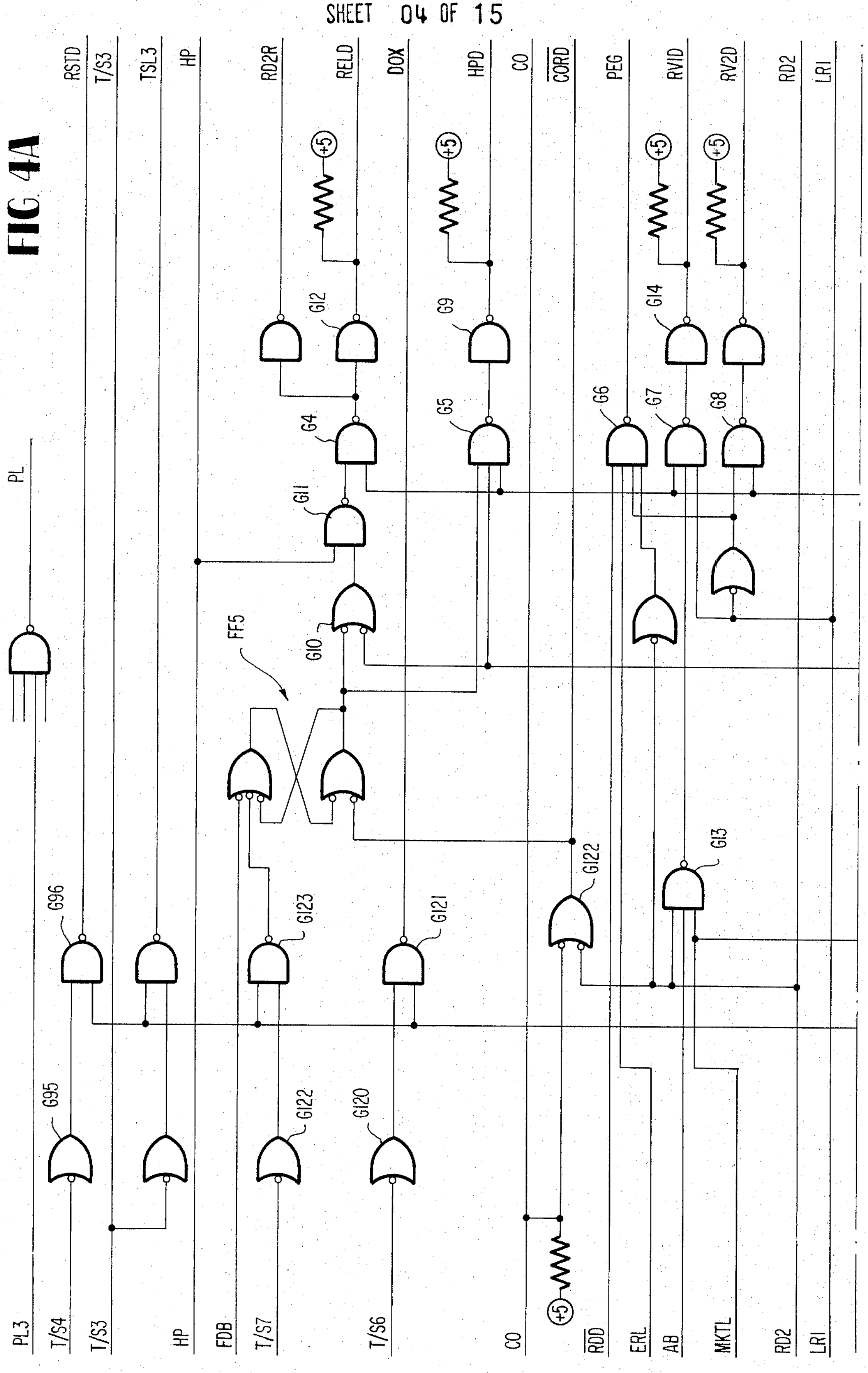
Figure 4B:
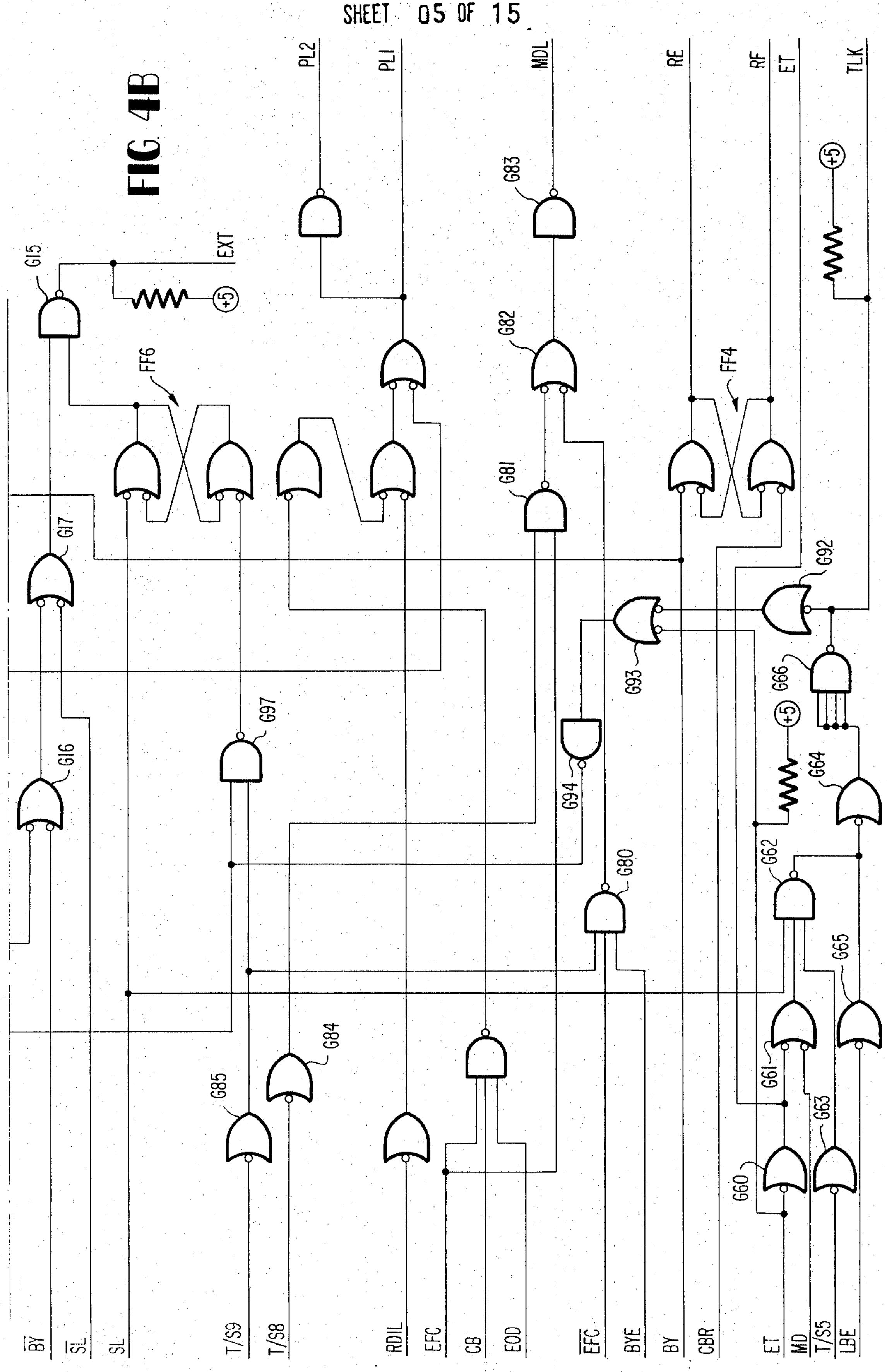

FIGS. 4A and 4B include a logic schematic diagram for the trunk circuit of the invention.

Figures 5, 12:
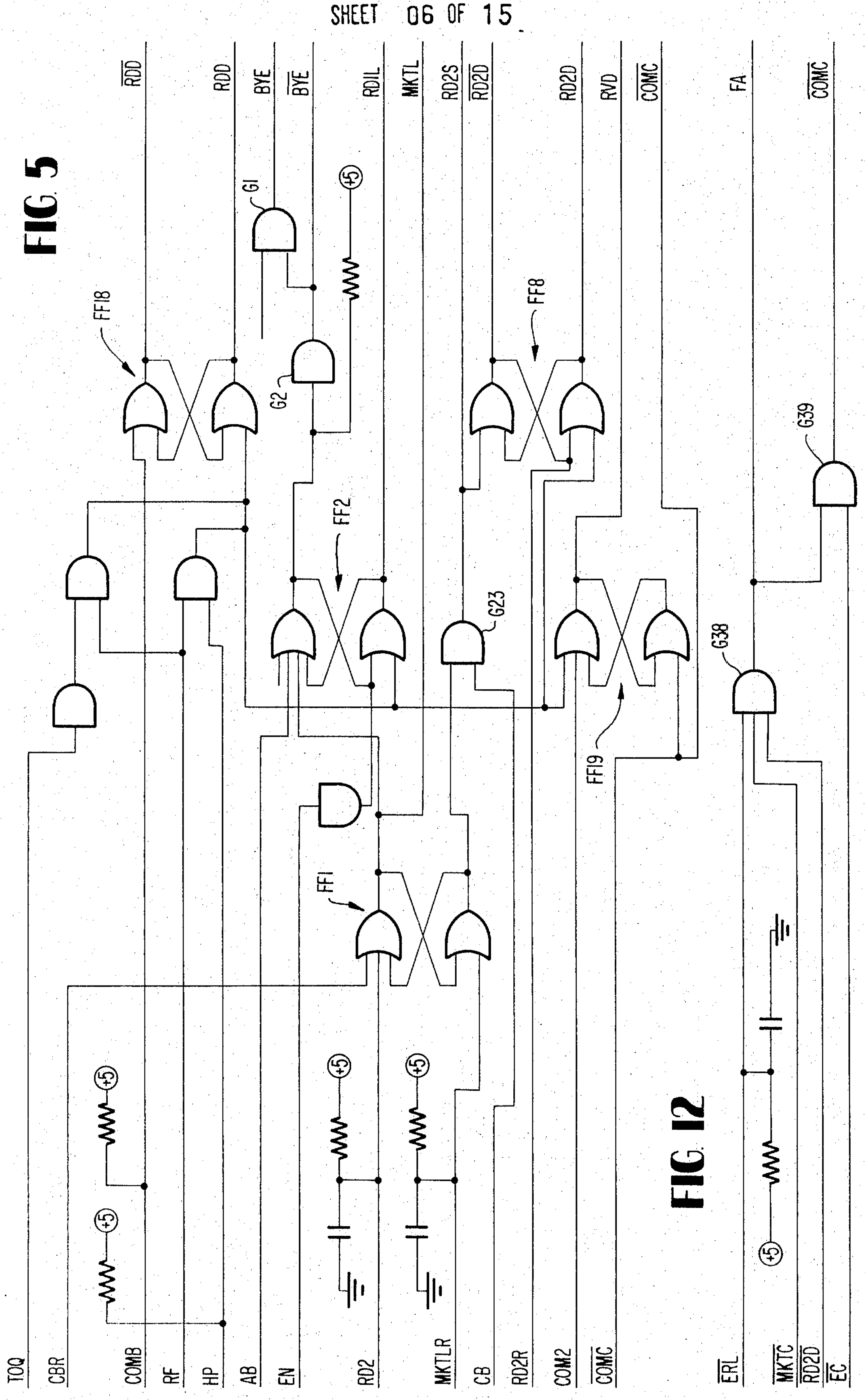

FIG. 5 includes another logic schematic diagram for the trunk circuit of the invention.

Figure 6:
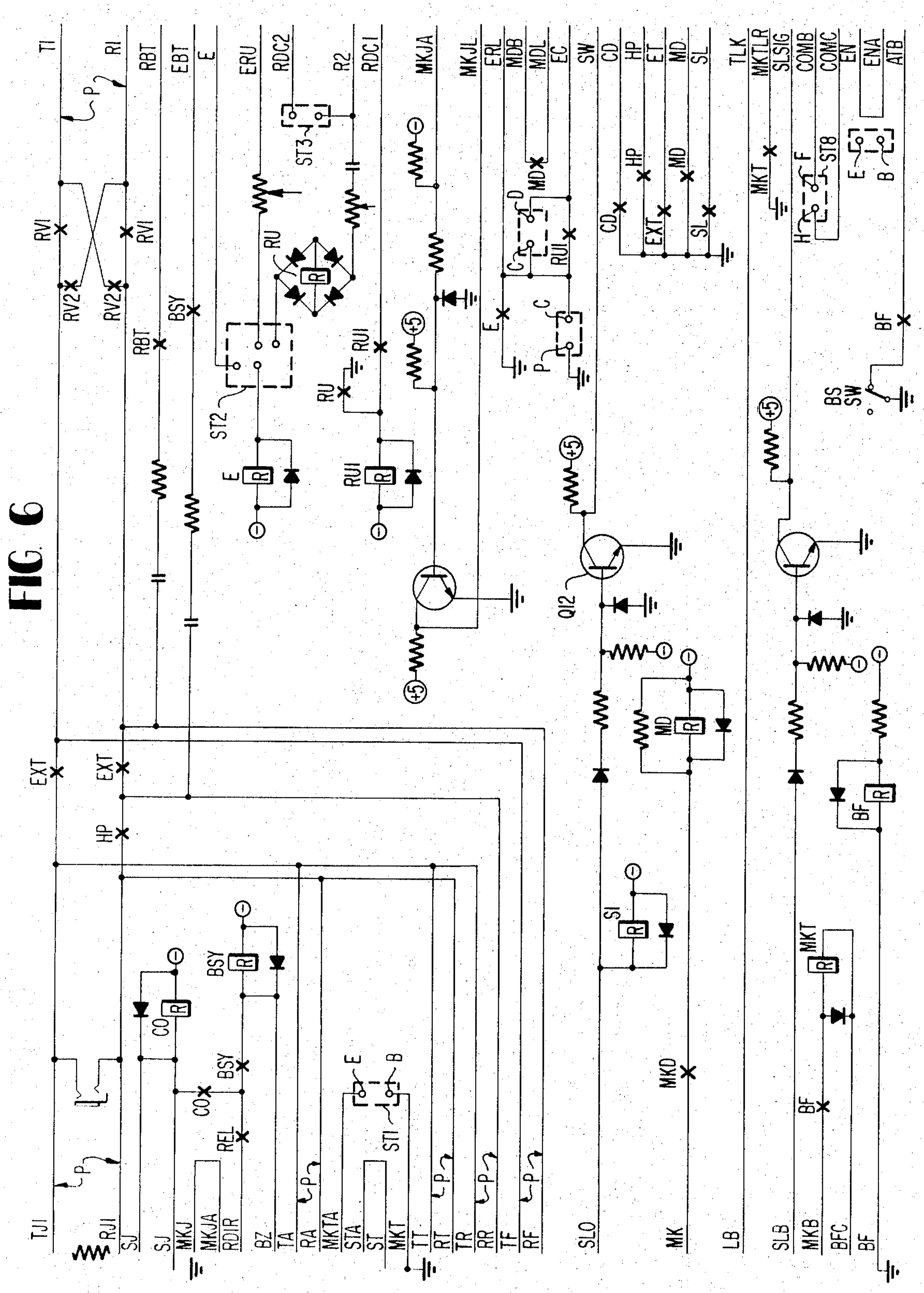

FIG. 6 includes a schematic diagram of the transmission path of the trunk circuit.

Figure 7:
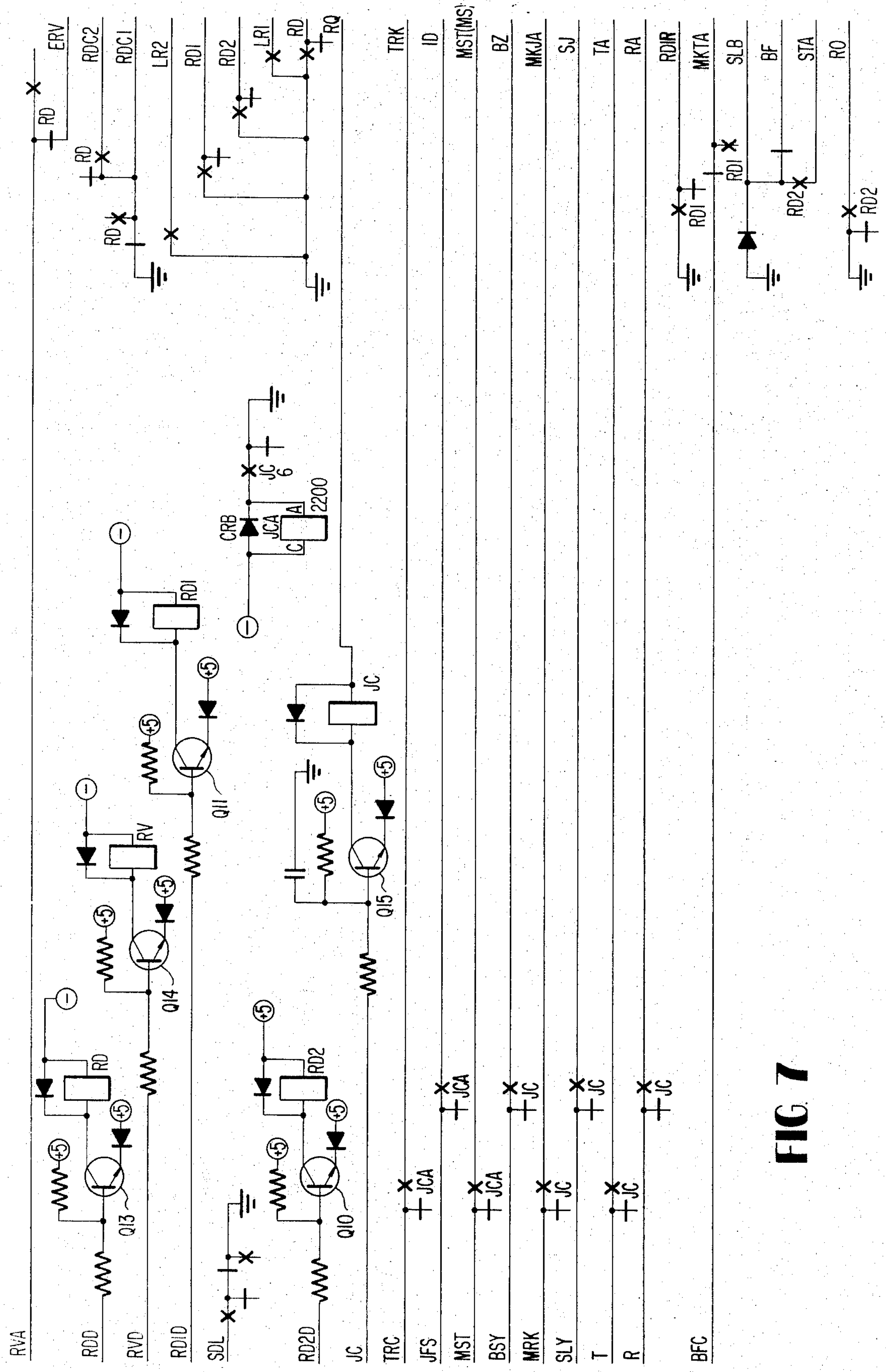

FIG. 7 includes a schematic diagram of the relay circuit of the trunk circuit.

Figure 8:
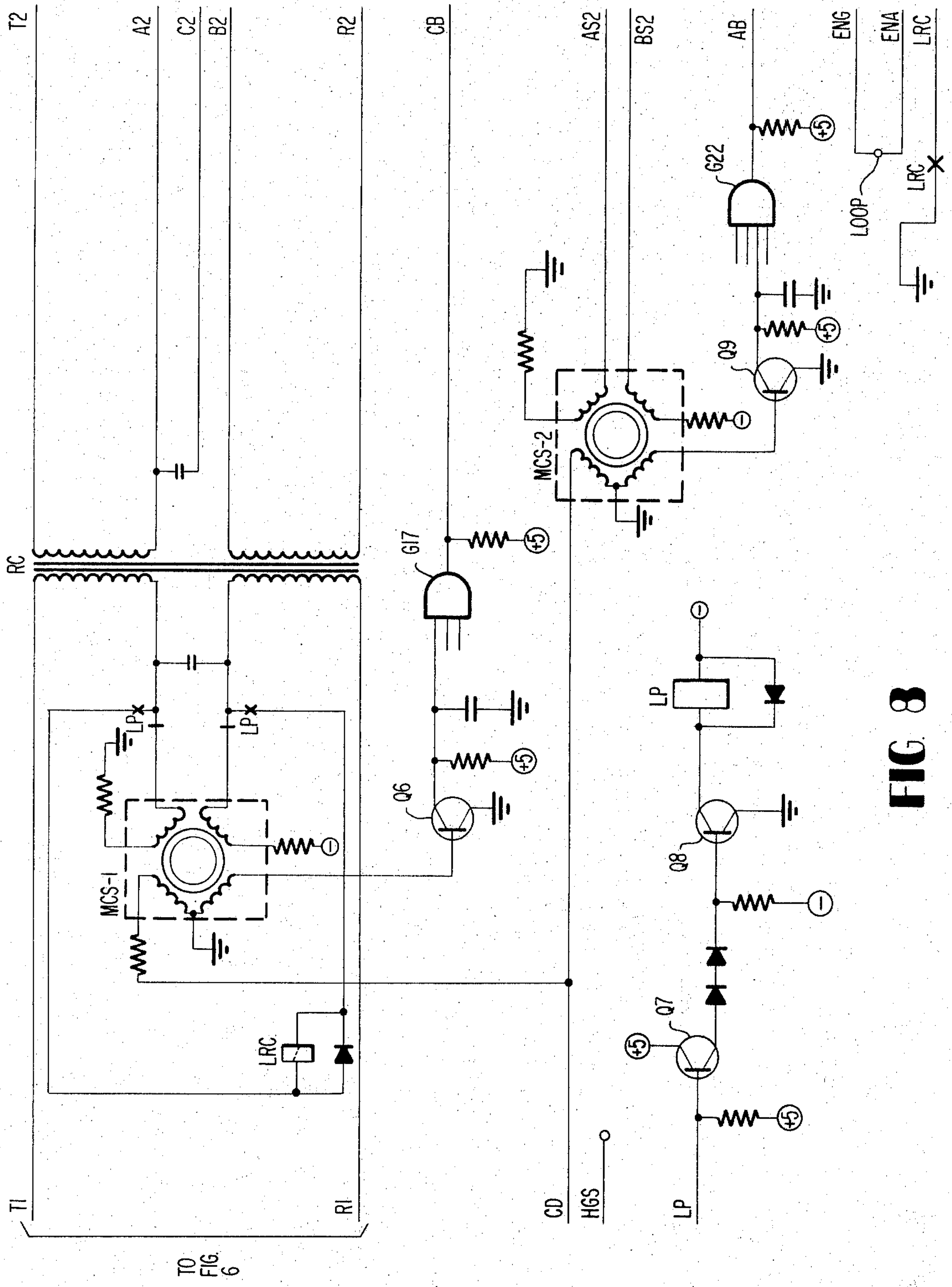

FIG. 8 includes a schematic diagram of a bridge circuit of the trunk circuit.

Figure 9:
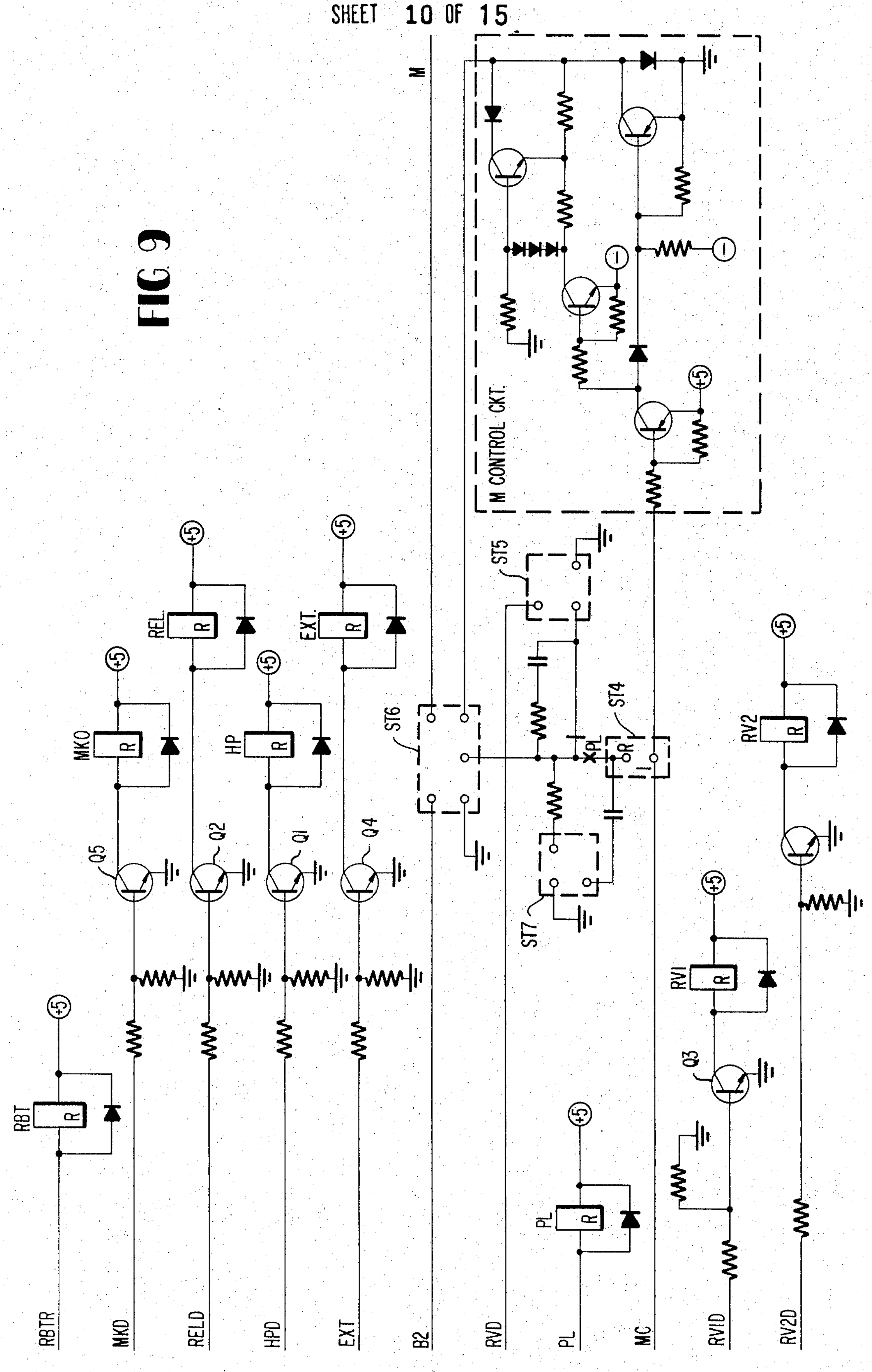

FIG. 9 includes a schematic diagram of another relay circuit of the trunk circuit.

Figure 10:
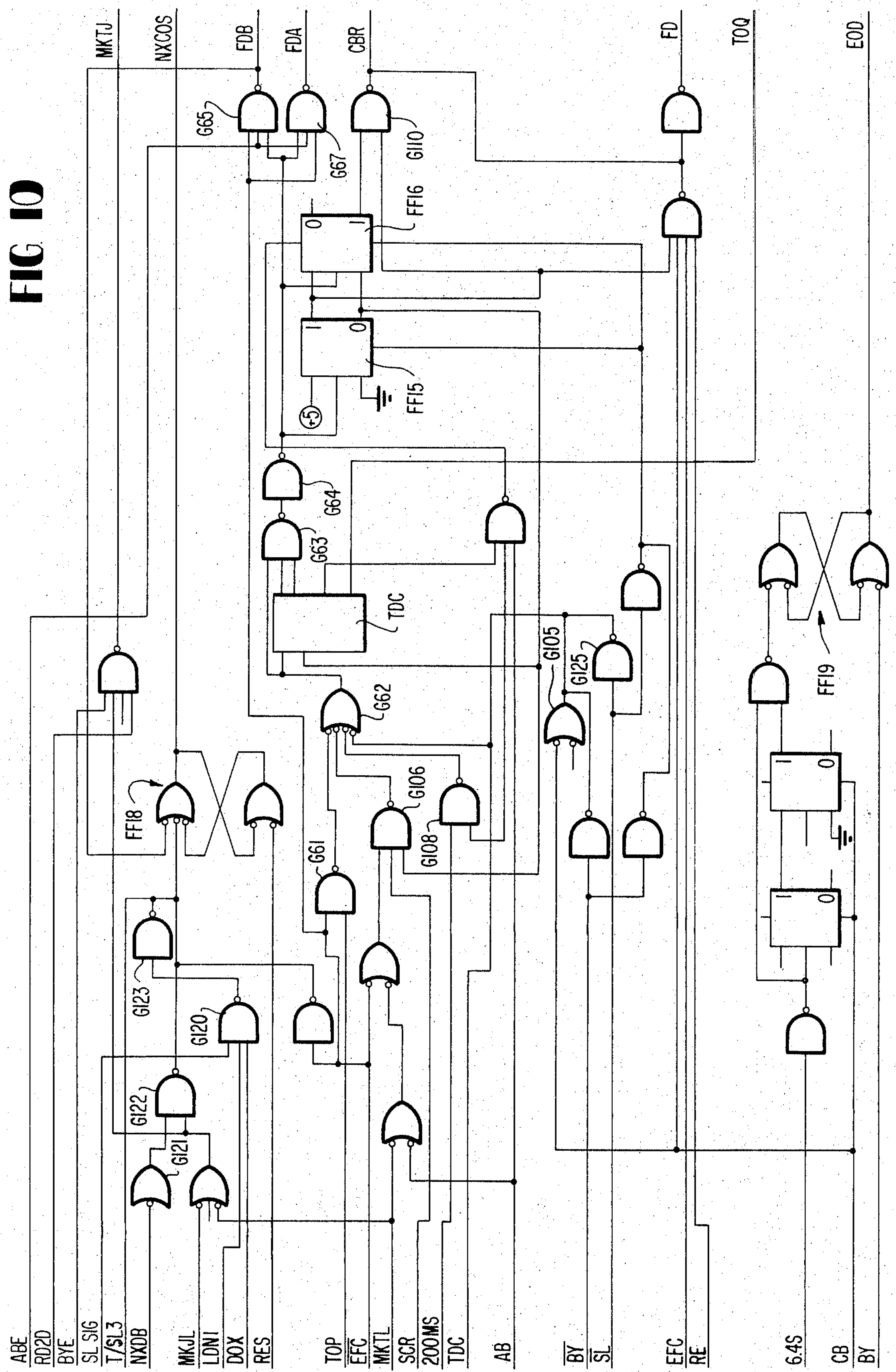

FIG. 10 includes another logic schematic diagram for the trunk circuit.

Figure 11A:
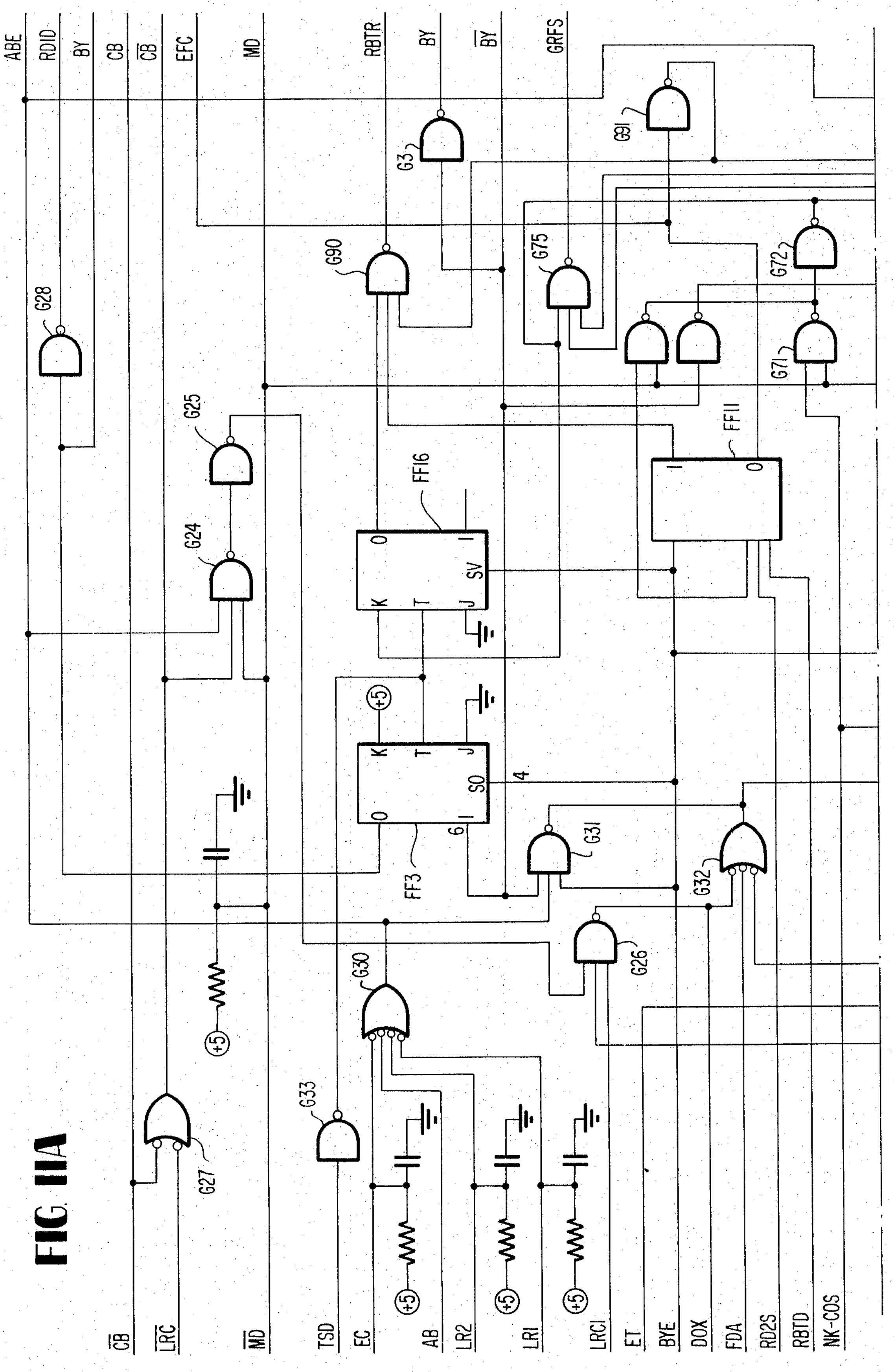
Figure 11B:
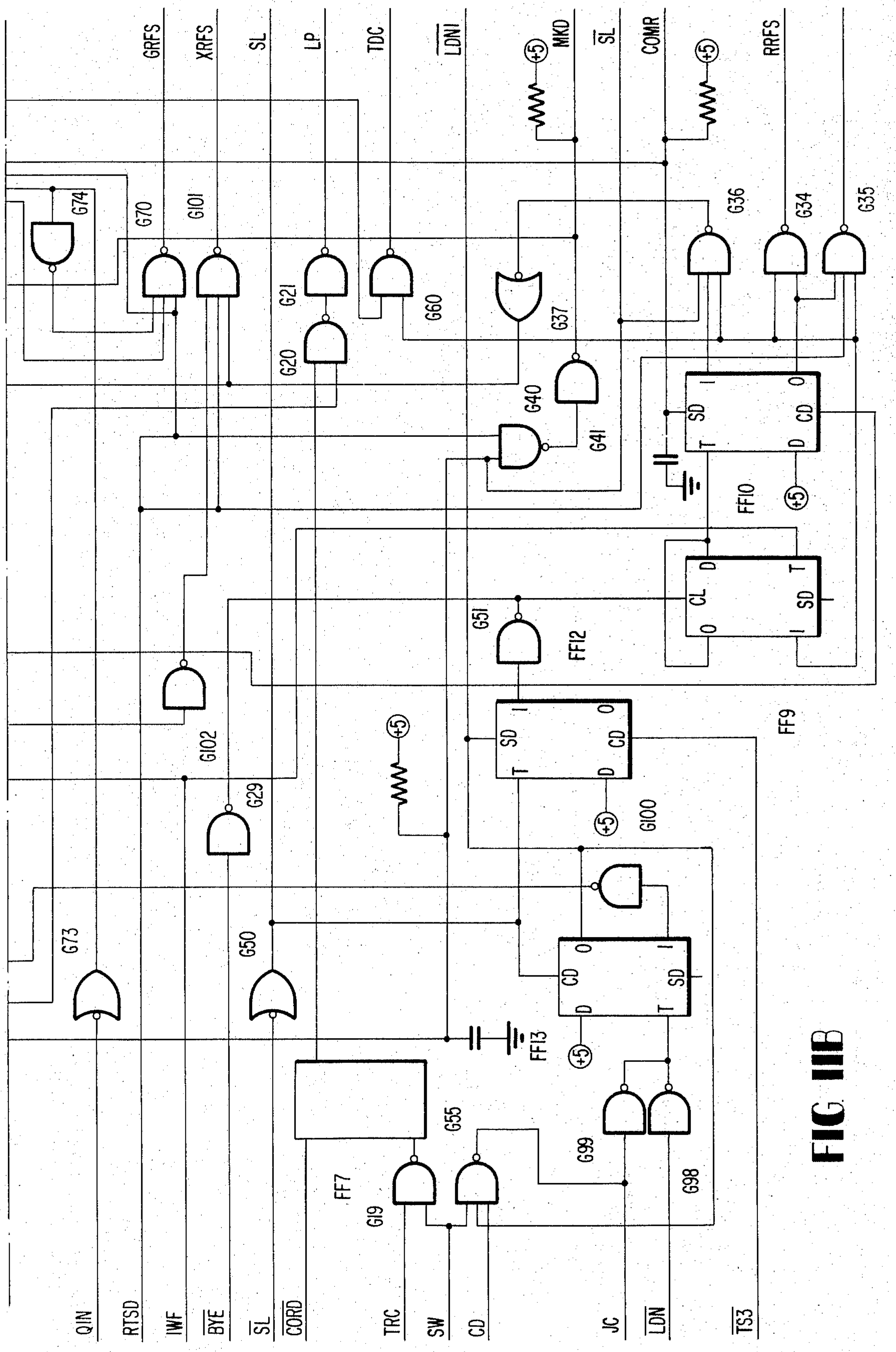

FIGS. 11A and 11B include another logic schematic diagram for the trunk circuit.

FIG. 12 includes another logic schematic diagram for the trunk circuit.

Figures 13, 14:
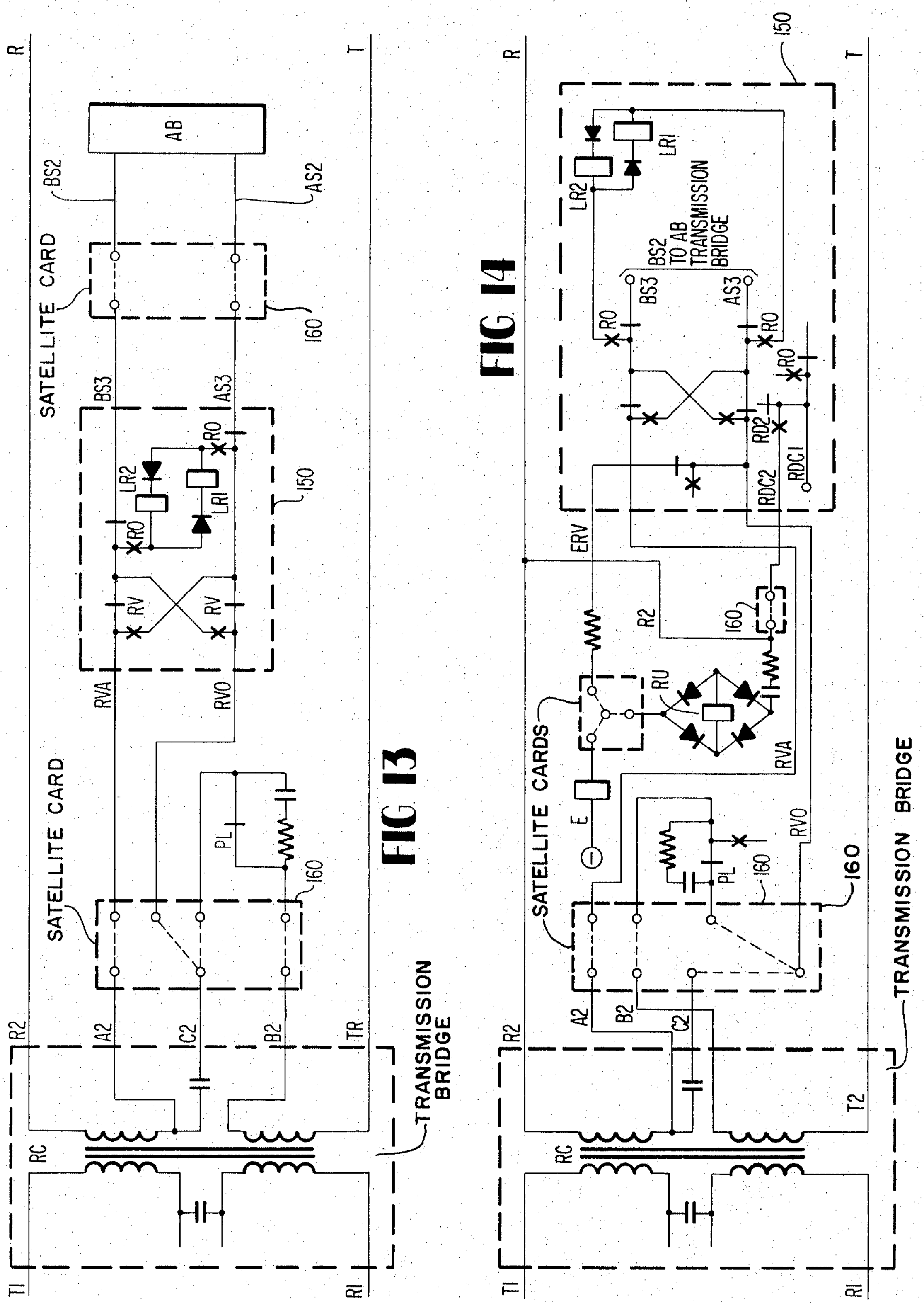

FIG. 13 includes a schematic diagram of a portion of a loop trunk.

FIG. 14 includes a schematic diagram of a portion of a CO trunk with ground start ring.

Figure 15:
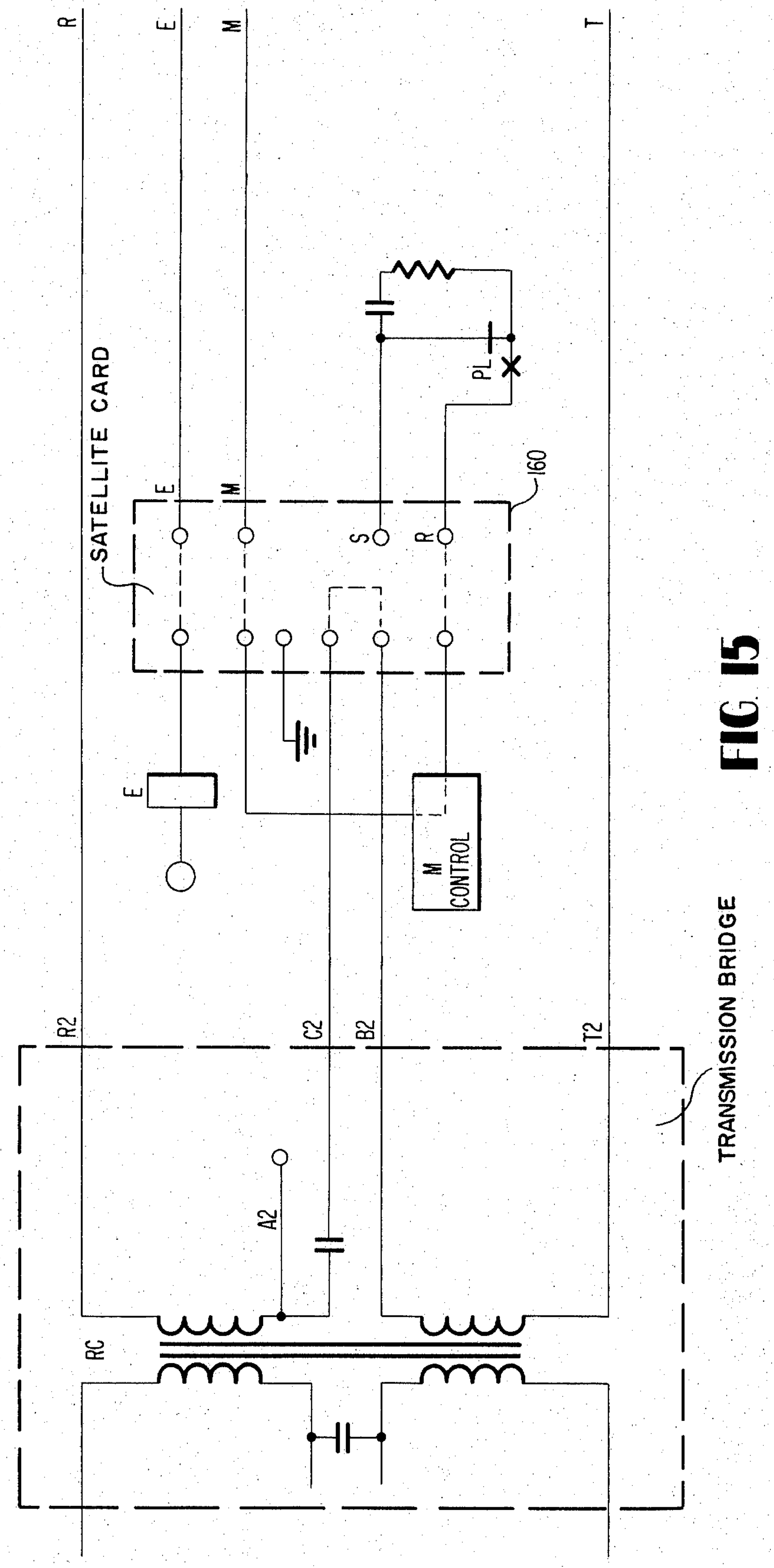

FIG. 15 includes a schematic diagram of a portion of an E and M trunk.

GENERAL SYSTEM DESCRIPTION

It will be seen from the drawings that FIG. 1 represents that portion of the system which relates to an electronic switching central; while, FIGS. 2 and 3 provide equipment which forms part of a private branch exchange. Thus, the most basic feature of the present invention, which provides for the combination of an electronic switching central with a private branch exchange, can be easily recognized from FIGS. 1–3.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN is connected to a plurality of line circuits such as the conference line circuits 10 and 12, typical subscriber line circuits 14, 16, 18, and transfer line circuits 20 and 22. The number of subscriber line circuits provided vary in number in dependence upon the telephone service to be offered, but may typically exceed four thousand lines. The typical subscriber line circuits 14, 16, and 18 are more fully described in copending U.S. Application Ser. No. 153,233 filed on June 15, 1971, by Otto Altenburger, now U.S. Pat. No. 3,708,627, which is assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path-finding need be performed between the ringing controls 54 and 56 and a line circuit through the line link network.

The terminations for the originating paths through the line link network are connected to one of a plurality of junctors, such as junctors 26 and 28. The number of junctors and ringing controls provided depends upon the traffic requirements for the system. The ringing controls are more fully described in U. S. Pat. No. 3,671,678, issued on June 20, 1972, in the name of Otto Altenburger, which is assigned to the same assignee as the present invention. The junctor circuits 26 and 28 and the junctor control circuit 30 are more fully described in copending U. S. Application Ser. No. 100,571, filed on Dec. 22, 1970, in the name of Otto Altenburger, now U.S. Pat. No. 3,705,268, issued Dec. 5, 1972, assigned to the same assignee as the present invention.

The junctors 26 and 28 serve as the focal points for all local originating traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off-hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off-hook condition and is used for both originating and terminating types of traffic. In the event of originating traffic, the line scanner stops when an off-hook condition is detected and transmits the information from its counter circuits to a marker circuit to mark the particular line circuit and enables the SLN control 33 to initiate a path-finding operation between an available local register and the line circuit requesting service. In the even of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required throughout the junctor control 84 to the ringing control 34. The line scanner-marker circuit 50 is more fully described in copending U. S. Application Ser. No. 101,091, filed on Dec. 23, 1970, in the names of Gunter Neumeier and Otto Altenburger, now U.S. Pat. No. 3,699,263, issued Oct. 17, 1972, assigned to the same assignee as the present invention.

The trunk line network (TLN) 52 provides for the termination of the local traffic to local subscribers, the termination of incoming calls from other exchanges to the local subscribers, and for the connection of incoming calls from other exchanges to other external exchanges. The TLN 52 includes a three-stage network. When further expansion is necessary, another stage can also be included. A D stage of the matrix is the entrance to the TLN and is connected to the local junctors 26 and 28. An F stage is the output or exit of the TLN and is connected via the ringing controls to the line link network 24 and also to the trunk circuits.

Path-finding through the trunk link network 52 is performed under the control of the TLN control 51 and the junctor control 30. The TLN control 51 and the junctor control 30 work together in completing the termination portion of a call, whether it is an internally terminated call or an outgoing call to a distant office. The number and code translator 46 and line scanner-marker 50 are used to complete calls to local lines, and the number-code translator together with the outgoing trunk marker 48 complete calls to the trunks. The outgoing trunk marker is more fully disclosed in application Ser. No. 103,267, filed Dec. 31, 1970, in the names of Otto Altenburger and David Stoddard, now U.S. Pat. No. 3,732,377, issued May 8, 1973, assigned to the same assignee as the present application.

The path-finding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particualr trunk circuit. The path-finding sequences through the SLN and the TLN along with the equipment associated therewith are more fully described in copending U. S. Application Serial No. 153,221, filed on June 15, 1971, in the names of Otto Altenburger and Robert Bansemir, now U.S. Pat. No. 3,729,493, issued Apr. 24, 1973, assigned to the same assignee as the present invention.

Looking now to the portion of the system illustrated in FIGS. 2 and 3, which includes the (PBX) privage branch exchange portion, five types of trunk circuits may be provided in the telephone system of the present invention; however, only an incoming/outgoing trunk 60 providing direct inward and direct outward dialing, an attendant trunk 62, and access trunk 64 are illustrated. The access trunks 64 are used solely by the operators to originate calls to the subscriber stations; while, the attendant trunks 62 are used by the local stations for access to the operator, from which they can be extended to another trunk or local station. The incoming/outgoing trunks 60 interface the telephone exchange with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunks 62 and serves to select a trunk circuit for a call originated by one of the local subscribers in response to the dialed digits as analyzed by the number and code translator 46.

An operator service link network (OSLN) 68 controlled by an OSLN control 58 is provided for connecting the trunks 60, 62, and 64 to various service circuits such as the dial pulse acceptors 72–74, transfer circuits 74–76, and loop circuits 78–84. The operation of the OSLN 68 and the OSLN control 58 and the method of signaling through the OSLN is fully described in two copending U. S. patent applications entitled "Path Finding System", Ser. No. 92,593, filed Nov. 25, 1970, in the names of Klaus Gueldenpfennig and Stanley L. Russell and entitled "Telephone Switching Network Signalling System", now U.S. Pat. No. 3,729,591; Ser. No. 92,588, filed on Nov. 25, 1970, for Klaus Gueldenpfennig, Stanley L. Russell and Uwe A. Pommerening, now U.S. Pat. No. 3,707,140, both of which applications are assigned to the same assignee as the present invention. The loop circuits 78–84 are separated into two groups 78–80 and 82–84, the former being connected to an operator console 104 via a position circuit 88 and the latter being connected to another operator console 106 via a position circuit 90. The loop circuit groups 78–80 and 82–84 are associated with rotaries 77 and 81, respectively, which serve to preselect an available loop for connection to the associated position circuit in preparation for a request for connection from a trunk to the operator console via its associated position circuit through the OSLN 68. The position circuits 88 and 90 are connected to the system timer forming part of the common control for the PBX portion of the system, and the position circuits also are directly connected to a dedicated incoming register, such as 40 and 42, associated with the register common 44 and number and code translator 46 in the ESC portion of the system. If it is not desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines. The connection of any of the trunks to any of the service circuit groups is fully disclosed in our copending U. S. Patent Application, Ser. No. 293,750, "Private Automatic Branch Exchange Service Circuit Complex", filed jointly herewith, now U.S. Pat. No. 3,769,462, issued Oct. 3, 1973, assigned to the assignee of the present invention. The operation of the position and loop circuits is fully disclosed in a copending application entitled "Operator Loop Complex", Ser. No. 293,572, filed jointly herewith and assigned to the assignee of the present invention.

The incoming/outgoing trunk circuit 60 may also be connected through the OSLN to one of several dial pulse acceptors 72–74, which, although shown separately for convenience, form part of the dedicated incoming registers 38–40, respectively. The dial pulse acceptors 72–74 are also preselected by a rotary 69 for connection through the OSLN 68 to a trunk upon request for service and are accessed by the trunk scanner 89 via the rotary 69.

The incoming/outgoing trunks 60 may also be connected through the OSLN 68 to transfer circuits such as 75–76, which are connected, respectively, to a dedicated transfer line circuit 20–22 at the input of the line link network 24. The transfer circuits are also preselected by a rotary 73 in preparation for a request for connection through the OSLN 68 to a universal trunk 60. The transfer operation includes the use of a transfer common 86 which is connected to the transfer circuits 75 and 76 and has a dedicated input to the service link network 32 for obtaining access to a local register 34–36. The transfer circuits and transfer common 86 are also connected to the system timer 94 and trunk scanner 89 via the rotary 73. The operation of the transfer circuit and transfer common is fully disclosed in a copending application entitled "Transfer Circuit", Ser. No. 293,681, filed jointly herewith and assigned to the assignee of the present application.

A queue 96 is provided in association with the universal trunks 60 and attendant trunks 62 to provide for servicing of requests for the operator on a first-come, first-served basis. The operation of the queue 96 is fully described in our copending application entitled, "Queue for Electronic Telephone Exchange", Ser. No. 108,380, filed Jan. 21, 1971, now U.S. Pat. No. 3,702,380, which is assigned to the same assignee as the present application. The queue 96 is connected between each of the universal and attendant trunks and the trunk scanner 89 and serves to forward the trunk scanner 89 the request for operator signals as they appear at the output of the queue in conjunction with the scanning of the particular trunk by the trunk scanner 89. The trunk scanner 89 scans each of the incoming-/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to access an operator, a request for a transfer circuit, or the request for a DPA in connection with a direct inward dialed call. If a requested service circuit is available when the request is received in the trunk scanner 89, a stop scan signal will be generated and the request for service signal will be forwarded to the service circuit.

The system timer 94 scans each of the operator position circuits and transfer circuits in sequential order simultaneously with the more rapid scanning of the dial pulse acceptors 70 and 72. When a stop scan signal has been generated in the trunk scanner 89 and a request for service signal has been forwarded to the circuits of the type requested, the first circuit preselected by the rotary which is scanned by the system timer 94 will be seized and connection through the OSLN 68 from the trunk to the selected circuit will be effected.

The system in accordance with the present invention also provides for various special features circuits including a message waiting and do not disturb system 92, a conference system 98, and a camp-on system 100. The camp-on system is disclosed in our U.S. Pat. Nos. 3,676,606 and 3,679,835, both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require certain information concerning the communication connection, such as the calling and called line circuit directory numbers, the class of service of the various parties involved and the numbers of the trunks which may be involved in the call. This type of information is not retained by the ESC portion of the system once the connection through that portion of the system is completed and so the present invention provides a PBX--ESC interface and line number store 66 which receives information concerning the subscriber line circuits and the class of service of these circuits at the time the connection through the ESC is effected so that this information may be received and stored in the PBX portion of the system for further use in connection with the special service features. For example, each time a trunk is marked for connection to a subscriber station, the data concerning the subscriber station, including the directory number and class of service thereof, will be forwarded via line 45 to the PBX–ESC interface and line number store 66 for storage therein or for transfer into the trunk circuit itself. For example, the transfer class of service will be forwarded to the trunk circuit upon connection thereof to the subscriber station by enabling of the NX data bus from the store 66 each time a connection to a trunk is effected. In conjunction with the message-waiting-and-do-not-disturb function performed by the circuit 92, the ESC will pause prior to completing a connection to any line circuit to request of the message-waiting-and-do-not-disturb circuit 92 whether that line circuit may be in a do-not-disturb status. Signaling concerning dialed information from the number and code translator 46 and the PBX portion of the system is also effected through the PBX–ESC interface 66, such as signaling in connection with the dialing from the outside world of the listed director number of the system by enabling the LDN lead or dialing by an inside subscriber of "0" on a transfer operation by enabling the DOX lead.

THE TRUNK CIRCUIT

As is well known, the basic function of the trunk circuit in a telephone exchange is to provide a communication path from a subscriber line circuit within the exchange on an outgoing line to a distant exchange where connection may be made to a subscriber of that exchange. Where the trunk circuit is associated with a private branch exchange, connection may also be provided from the transmission path extending either to the inside subscriber or the outside world to an operator. The trunk therefore functions to coordinate the necessary connections through the trunk link network to an inside subscriber or on an outgoing line to a distant exchange with connections to the operator through an operator service link network, in the particular private branch exchange described in connection with FIGS. 1–3, to effect that service which is requested by the subscriber and which is available to him for his particular class of service.

As seen in FIG. 6, the transmission path consisting of tip and ring leads T1 and R1 are provided which extend to a standard transmission bridge in the form of a repeat coil RC, which is illustrated in greater detail in FIG. 8. The trunk is provided with a junctor port formed by the lines TJ1 and RJ1 extending to the junctor side of the trunk link network and a trunk port formed by the tip and ring leads TT and RT which extend to the trunk side of the trunk link network. Associated with the tip and ring leads TJ1 and RJ1 are sleeve lead SJ and mark lead MKJ. Associated with the tip and ring leads TT and RT are the sleeve lead ST and mark lead MKT. The trunk circuit also provides rear and front ports extending to the operator service link network formed by lines TR, RR, and TF, RF, respectively. A sleeve lead SLO and a mark lead MK also extend to the operator service link network along with the signaling lead LB by which the trunk is controlled through the connection to the operator service link network.

Various relays are provided in the trunk circuit for controlling connection of the tip and ring leads from the transmission bridge either exclusively to the operator service link network or from the operator service link network exclusively through the trunk link network to an inside subscriber line circuit as well as effecting the connection between a subscriber within the system and the outside world. The standard relays for reversing battery to the outside world for answer supervision as well as busy and mark relays for controlling seizure of the trunk as well as a release delay and busy tone relay, which perform well-known functions.

As already indicated, one of the special features of the present invention is the provision of a trunk circuit which includes those elements necessary to accommodate interfacing with the various types of exchange equipment with which the trunk might be associated. For making possible such a universal circuit, various strapping, or programming combinations are made available within the trunk circuit in association with the provision of printed satellite cards by which the various interface combinations may be easily selected. Thus, for example, by merely changing a satellite card, a trunk circuit may be changed from a loop trunk to a CO trunk with ground start ring or to an E and M trunk, for example, These advantageous features of the present invention will be now described in greater detail in connection with the specific PBX system described and illustrated in connection with FIGS. 1–3; however, it should be understood that the basic principles of the present invention have general application to trunk circuits which may be associated with other telephone systems than the PBX system specifically described herein.

The trunk circuit advantageously has two quiescent states in addition to its normal operating state so that a minimum amount of power is used when the trunk is idle or in a stand-by condition. In the first quiescent state, the trunk is unconnected and therefore in the idle condition with only a single relay actuated to indicate the availability of the trunk. In the second quiescent or standby state, the trunk is seized and awaits further instructions concerning the type of operation desired. In this stand-by condition, the trunk has a minimum of relays operated so that the amount of power which is used by the trunk is kept to a minimum.

When the number and code translator 46 in the ESC determines from the dialed digits received from a subscriber that a trunk is required for connection to the outside world, the outgoing trunk marker 48 is instructed to extend negative battery to the mark battery leads MKB of the trunks in the system. At the same time, the TLN control 51 causes a ground switch mark to be extended from the junctor control 30 through the junctor to the trunk link network 52 so that a scanning of the trunks for availability can be undertaken under control of the TLN control 51.

As seen in FIG. 6, negative battery is received from the trunk marker on the mark battery lead MKB and is applied through the normally closed busy-free relay contacts BF and through the mark trunk relay MKT. The busy-free relay BF is the only relay which is normally operated in the idle condition of the trunk by connection of ground to the line BF from FIG. 7 through the normally closed contacts of the idle RD2 relay. As will be explained hereinafter in greater detail, once the trunk is seized and connected to the trunk link network 51, the RD2 relay will be operated to release the busy-free relay BF and thereby busy the trunk by opening the MKB lead so as to prevent further seizure thereof.

The mark trunk relay MKT will be actuated when the ground switch mark is received from the trunk link network 52 on input lead MKT. The ground mark extends from the line MKT through a strap connection ST1 to the line MKTA extending to FIG. 7 where it passes through the normally closed contacts of the idle release delay relay RD1 to the line BFC, where it is returned in FIG. 7 to be connected to the relay MKT. The strap connection ST1 is for interlock purposes only, to prevent seizure if one of the component cards forming the trunk is removed for service.

As soon as the current path is established from the outgoing trunk marker 48 through the trunk to the TLN on the mark lead, the TLN scanner is stopped and the TLN control 51 will initiate operation of the MKT relay to effect connection to tip and ring leads to the selected trunk circuit. With the operation of the MKT relay, the trunk circuit will internally set itself into the second quiescent state of readiness. This is initiated by connection of ground through the closed MKT contact to the MKTLR lead from FIG. 6 to the mark latch flip-flop FF1 in FIG. 5. To be independent of the length of the systems mark, the flip-flop FF1 is set by the applied ground mark, which in turn toggles the busy-enable flip-flop FF2 and generates an output on lead MKTL. The setting of the busy-enable flip-flop FF2 results in generation of the busy-enable signals BYE and $\overline{BYE}$ at the outputs of gates G1 and G2, respectively.

The busy-enable signal is applied directly to the busy flip-flop FF3 in FIG. 11, the setting of this flip-flop serving to initiate a sequence of operations which will place the trunk circuit in a ready condition and permit it to respond to various commands which may be received from the ESC common control or the PBX common control. In the set condition, the busy flip-flop FF3 provides a busy signal BY at the output of gate G3, which is applied to the sequence control gates in FIG. 4. The busy signal BY is applied along a common bus to a plurality of gates G4, G5, G6, G7 and G8 to enable operation of these gates thereby generating the necessary relay drive signals to place the trunk in its standby condition.

The busy signal BY is applied to one input of the gate G5, which also receives on the other two inputs thereof the reset outputs of the release trunk flip-flop FF4 and the release ESC flip-flop FF5, which obviously are not set at this time since the trunk circuit is merely in the process of being set up to connect to the ESC. As a result, the output HPD of gate G9 goes high (+5V) enabling the drive transistor Q1 in FIG. 9 to actuate the HP relay.

As seen in FIG. 6, the HP relay has contacts in series with the ring lead RJ1 of the junctor port of the trunk circuit and ring lead RT of the trunk port of the trunk circuit and is used as the initial make or break contact to avoid current switching by the other relays. A second contact of the HP relay is found in FIG. 6 and serves to connect ground to the HP lead extending to one input of a gate G11 in FIG. 4. With the release trunk flip-flop FF4 and the release ESC flip-flop FF5 in the reset state at this time, ground is also applied through the OR gate G10 to the other input of gate G11 which provides a high at the input of gate G4. The other input of gate G4 also receives a high from the BY bus thereby enabling the lead RELD at the output of gate G12. The lead RELD extends to the drive transistor Q2 in FIG. 9, which now operates the REL relay. It should be noted that the REL relay cannot operate until the HP relay has operated, since it requires the ground applied through the contacts of the operated HP relay at the input of gate G11, and therefore the REL relay operation and release always follows operation and release of the HP relay. As seen in FIG. 6, the REL relay has contacts in the line extending from input RD1R, to the sleeve lead SJ at the junctor port which will connect ground to the sleeve lead extending to the trunk link network, and so it is desirable to provide release of the HP relay prior to the REL relay in order to ensure that ground is not removed from the sleeve lead SJ until the transmission path is open. At the time the busy flip-flop FF3 is set, the reset output of the flip-flop will provide a signal RD1D through gate G28 in FIG. 11 to drive transistor Q11 in FIG. 7 thereby operating the RD1 relay. Upon operation of the release delay relay RD1, ground will be extended on the lead RD1R to FIG. 6 through the closed contacts of the operated release relay REL and contacts of the CO relay as soon as it is operated by receipt of ground on the sleeve lead SJ from the junctor control, so that the sleeve will thereby receive ground from the trunk to hold up the switch train in the trunk link network. Thus, the REL relay controls the holding of the switch train from the trunk as well as providing holding ground for the CO relay.

At this point, the trunk is seized but the transmission pair is not yet connected to the trunk link network. The junctor control is checking the tip and ring leads through the trunk link network to the trunk circuit to detect battery on the ring lead and ground on the tip head. As seen in FIG. 6, however, additional relays must be operated in the trunk before the tip and ring leads will be connected from the trunk link network to the transmission bridge on lines T1 and R1. These relays include the extend relay EXT and the reverse relay RV1. At this point, we know that a path has been established through the trunk link network because the MKT lead and the MKT relay are in series with all of the cross points in the TLN so that the junctor control can look directly through metallically into the trunk circuit on lines TT and RT of the trunk port and leads TJ1 and RJ1 of the junctor port in FIG. 6; one pair of leads (TT and RT) goes to the trunk link network D stage, and the other pair (TJ1 and RJ1) goes to the F stage.

Looking once again to FIG. 4, it is seen that the busy signal BY extends to one input of a gate G7. A second input of gate G7 connected to the output of gate G13 is high (+5V) as a result of the ground on lead MKTL derived from the output of the mark latch flip-flop FF1 in FIG. 5. A third input of gate G7 connected to the lead LR1 is high (+5V) since the control relay in the outside world telephone loop is not operated. The output RV1D from gate G14 goes high (+5V) operating the drive transistor Q3 in FIG. 9 to operate the RV1 relay. This closes contacts in the transmission pair as seen in FIG. 6.

The extend relay EXT is driven in a smaller manner through gate G15, which receives an input from the release OSLN flip-flop FF6, which is naturally reset at this time. The other input of gate G15 is enabled via gates G16 and G17 by the output MKTL from the mark trunk flip-flop FF1 in FIG. 5, the busy signal $\overline{BY}$ from the busy flip-flop FF3 in FIG. 11 and the signal $\overline{SL}$ indicating that the sleeve from the OSLN is not connected and therefore the SL relay is not yet operated. The result is an output EXT from gate G15 drives transistor Q4 in FIG. 9 to operate the extend relay EXT. With the contacts of this relay closed in the transmission pair, as seen in FIG. 6, the inputs TJ1 and TJ2, as well as the inputs TT and RT, are connected through to the lines T1 and R1 which extend to the transmission bridge completing the loop returning battery to the TLN.

The transmission bridge is illustrated in FIG. 8. Lines T1 and R1 extend to the standard repeat coil transformer RC and to the magnetic core sensor MCS1 through the normally closed contacts of the unoperated LP relay. Negative battery is provided on the ring lead R1 and ground is applied to the tip lead T1. The magnetic core sensor MCS1 receives a 15 KHz signal applied to line CD. When the loop is complete to the TLN, the 15 KHz signal is knocked down, which serves to operate transistor Q6, Thus, a calling battery signal CB is provided at the output of gate G18 to the trunk logic indicating completion of the loop to the ESC.

As seen in FIG. 5, the signal CB is applied to one input of gate G23 which has its other input enabled by the mark trunk latch flip-flop FF1. The output of gate G23 sets the RD2 latch flip-flop FF8 and also provides the ouput signal RD2S. The flip-flop FF8 also generates a signal RD2D which extends to FIG. 7 where it drives transistor Q10 to operate the RD2 relay. With operation of the RD2 relay, the normally closed contact of this relay which connects ground to the BF lead and maintains the busy-free relay BF in the operating condition in the idle state of the trunk circuit opens thereby busying the trunk and preventing further seizure thereof. This, of course, also opens the path through the mark trunk relay MKT in FIG. 6; however, with the operation of the RD2 relay, the holding ground is now extended to the lead STA in FIG. 7, which as seen in FIG. 6 extends directly out to the trunk link network on lead ST. Thus, the trunk is seized and the path backwards to the trunk link network is being held by the ground extending from the trunk, and this condition will be maintained so long as the CB signal is present. With operation of the RD2 relay, ground is also applied through contacts of the relay to the lead RD2 in FIG. 7 which extends to the mark trunk latch flip-flop FF1 in FIG. 5 to reset this flip-flop.

In the case of an incoming trunk-to-trunk connection, the magnetic core sensor MSC1 is needed only during set-up since battery and ground will be provided to the transmission pair from the distant trunk. Accordingly, the TLN control will apply a signal TRC to the trunk which is received at one input of gate G19 in FIG. 11, the other input of which receives the switch mark SW from the register through the operator service link network 68. These two conditions produce an output at gate G19 which sets the trunk store flip-flop FF7 providing an output to one input of gate G20. The other input of gate G20 receives ground on line ET, which, as seen in FIG. 6, is applied through closed contacts of the operated extend relay EXT. This ensures that the core sensor in the transmission bridge is not cut out until the trunk has been cut through to the next trunk in a tandem configuration by operation of the extend relay. The output of gate G20 is applied through gate G21 as a signal LP to the base of transistor Q7 in FIG. 8, which operates transistor Q8 to actuate the LP relay. This disconnects the core sensor MCS1 from the transmission pair and connects relay LRC to the tip and ring leads T1 and R1. The LRC relay provides answer supervision upon detection of reversal of battery on the transmission pair. As long as we are now connected to the other trunk and the other trunk is supplying battery to us in the same manner that our trunk would supply battery to a telephone, LRC will be operated. As a result of the diode D1, the relay LRC will be responsive to reverse battery. When the distant telephone is answered, answer supervision is provided at the distant trunk which reverses battery back to our trunk which operates the LRC relay telling us that we have a distant party at the other end who has answered his telephone, whereupon the reversal is passed on to the trunk logic on lead LRC indicating answer supervision.

One of the features of the present invention is the ability of the trunk circuit to interface with different types of exchange equipment without requiring major revision, so that, in effect, the trunk circuit is universal in nature, being adaptable to connection as a loop trunk with direct inward dial and direct outward dial, a CO two-way trunk or an E and M trunk. Examples of the interfaces provided in the trunk circuit and the means for effecting the necessary conversion between the respective types of trunk circuits is illustrated schematically in FIGS. 13 through 15.

FIG. 13 shows a loop trunk combination with tip T and ring R lead being connected to the central office. In this arrangement there is provided loop dial wherein the loop is broken successively to provide the dial impulses; therefore, a PL contact is connected in the center of the transmission bridge and pulses with the breaking of the loop. The answering side of the transmission bridge RC is also connected to a standard reverse battery and relay supervision arrangement 150 including contacts from the reverse relay RV and a pair of loop supervision relays LR1 and LR2. The required connections from the answering side of the transmission bridge providing the loop trunk termination are made possible by a suitable printed satellite card schematically represented at 160 as a plurality of strapped interconnections between terminals. This satellite card arrangement is of the plug-in type and makes possible conversion of the trunk to the various interface combinations required. The different kind of submodules for different outside world or even inside functions are made possible by plugging in different satellite cards providing only the necessary wire connections to the different circuit arrangements which are provided and made available in the trunk circuit.

In the particular interface combination illustrated in FIG. 13, the loop trunk is provided with an answering bridge AB which is connected by the satellite card to the output of the circuit 150. The answering bridge arrangement is illustrated in FIG. 8 as comprising a magnetic core sensor MCS2 similar to that provided in calling side of the transmission bridge with the 15 KHz energizing signal being applied thereto from the line CD. Battery and ground are provided to the transmission pair through the answering side of the transmission bridge from the core sensor MCS2, which detects completion of the loop and generates the AB signal at the output of gate G22 through enabling of transistor Q9.

FIG. 14 provides a CO trunk two-way with ground start ring. When this trunk is seized ground is placed on the ring lead and the trunk circuit waits until it gets a ground back on the tip lead. For this arrangement, an E relay is strapped to the tip lead which is then energized when ground return is detected on the tip lead. Once again, the various connections of the transmission bridge to the E relay and the reverse battery and loop detection relay arrangement 150 are effected through the satellite card connections, as described in connection with FIG. 13.

In the E and M trunk arrangement illustrated in FIG. 15, the trunk can be operated either with the M lead connected to ground or to battery. Either interface can be provided by proper selection of the suitable satellite card 160. The M lead can be strapped by the satellite card 160 into an M control, which is more specifically illustrated in FIG. 9, the M control then being operated with a contact from a PL relay. There is nothing on ring and tip so that when the circuit is seized, it is necessary to let the M lead go battery and then remove ground. Then, when the circuit is seized at the outside work, ground will be returned either right away or it will return upon answering supervision on the E lead so as to operate the E relay. The contact of the E relay will now provide the necessary information inside the trunk to indicate that the connection has been established, provide answer supervision, peg counting, message metering and other functions.

The various relays, circuit elements and other connections illustrated in FIGS. 13 through 15, which provide the various interface combinations, can be found in FIGS. 6, 7 and 9 in association with various strapping terminal combinations. For example, the CO trunk two-way combination of FIG. 14 includes the E relay and rectifier bridge combination with the relay RU provided in FIG. 6 in association with the strapping blocks ST2 and ST3. The PL contact combination provided both in FIG. 13 and FIG. 14 is illustrated in FIG. 9 in association with the strapping blocks ST4 through ST7. FIG. 9 also includes a more detailed illustration of the M control provided in the interface combination of FIG. 15. The reverse battery and loop relay supervision combination 150 forming part of the combination illustrated in FIGS. 13 and 14 are illustrated in greater detail in FIG. 7. Thus, it can be seen that by providing a plurality of different circuit elements in the trunk circuit along with a suitable satellite card arrangement which permits the selection of those elements and the proper interconnection thereof to form the necessary interface with the particular central office or other exchange equipment to which the trunk is to be connected, a substantially universal arrangement is produced which eliminates the necessity to manufacture and store different types of trunks for different particular interface combinations.

As already indicated, the junctor control in the ESC will connect a checking relay across the transmission pair through the trunk link network to the trunk to detect the closing of the loop from the transmission bridge, at which time the trunk also monitors this condition. As soon as a loop is complete extending battery and ground on the transmission pair back to the trunk link network, the 15 KHz signal supplied to the core sensor from line CD gets knocked down because of the loop across the tip and ring leads causing the transistor Q6 to turn on and providing the signal CB at the output of gate G18.

For a CO trunk with ground start ring, ground is extended over the ring lead to the distant central office and ground will be returned over the tip lead in response, which condition is detected by operation of the E relay. This places ground on the lead EC and on lead ERL in FIG. 6, which leads extend to the respective gates G38 and G39 in FIG. 12. Since the RD2 flip-flop FF8 in FIG. 5 has been set to provide the output $\overline{RD2D}$ and the signal $\overline{MKTC}$ indicating an outgoing trunk call, gates G38 and G39 will be enabled to produce a signal $\overline{COMC}$. In this type of trunk the signal $\overline{COMC}$ is strapped to an output $\overline{COMB}$, which is applied in FIG. 5 to set the RD flip-flop FF18 thereby generating the signal RDD which drives transistor Q13 and operates the RD relay in FIG. 7. The RD relay serves to extend the loop to the OSW by placing ground on lines RDC1 and RDC2 to FIG. 6 and connecting line ERV from FIG. 6 through FIG. 7 to the line RVA on the ring lead to the transmission bridge. The signal $\overline{COMC}$ is also applied to FIG. 5 to set the RV flip-flop FF19 to generate the signal RVD, which is applied to transistor Q14 in FIG. 7 to operate the RV relay. The RV relay has contacts in lines RVA and RVO, as seen in FIGS. 13 and 14 which serve to reverse battery to the OSW for answer supervision.

When a loop trunk such as illustrated in FIG. 13 is seized from the outside world, the connection of the distant exchange to the transmission pair is detected by the core sensor MCS2 in FIG. 8, which operates transistor Q9 to produce at the output of gate G22 the answer battery signal AB. As stated previously for internal seizure of the trunk circuit, it is necessary initially in order to bring the trunk into operation to operate the busy-enable flip-flop FF2 in FIG. 5 so as to thereby generate the busy-enable signal BYE which operates the necessary relays to complete the transmission path through the trunk circuit and additionally busy the trunk so that it cannot be seized again until it is released. The answer battery signal AB is received at the input of the busy-enable flip-flop FF2 to set the flip-flop much in the same manner as the output of the mark trunk flip-flop FF1 has done during internal seizure; however, it will be noted that when the trunk circuit is seized by the outside world the mark trunk flip-flop FF1 is by-passed. The busy-enable signal BYE is then generated and will operate the respective gates G4, G5, G7, G8, and G17 in FIG. 4. The answer battery signal AB is also applied to a four input gate G30 in FIG. 11 to provide at the output thereof the outside world enable signal ABE, which represents either answer battery AB from the sensor or signal EC representing ground on the E lead from an E and M circuit or from the E lead on the ring if the trunk is set up as a ground start trunk. Any of these conditions can generate the ABE signal; thus, the EC input to gate G30 is derived from a contact of the E relay, the AB signal is the answer battery from the transmission bridge, and the LR1 and LR2 signals are derived from the monitor relays which are provided in connection with loop trunks.

The generation of an outside world enable signal at the output of gate G30 will initiate a request control operation involving the circuitry of FIG. 11. Since the trunk is seized by the outside world, connection will be made initially into a register so that the dialed digits can be received from the distant exchange to determine whether the call is a direct inward dialed call or a listed directory number call which requires connection to the operator. The trunk circuit therefore must signal the PBX common control equipment upon being seized by the outside world so as to initiate the connection through the operator service link network to an available register. The detailed operation of the operator loop complex and the manner in which the trunk circuits are scanned and selected by the trunk scanner 89 under control of the system timer 94 is more fully disclosed in our copending application Ser. No. 293,572, filed Sept. 29, 1972 and assigned to the same assignee as the present application.

The enable signal ABE is applied from the output of gate G30 to one input of a control gate G31. With the setting of the busy-enable flip-flop FF2 in FIG. 5, the busy-enable signal BYE is generated and applied to a second input of the gate G31 in addition to setting the busy flip-flop FF3 upon receipt of the time slot drive signal TSD via gate G33. The set output of the busy flip-flop FF3 is applied to the third input of gate G31, the output of which is then applied through OR gate G32 to set flip-flop FF9. With flip-flop FF9 set and flip-flop FF10 reset, the trunk is internally prepared to immediately generate a register request signal RRFS. The set output from flip-flop FF9 and the reset output from flip-flop FF10 are applied to respective inputs of AND gate G34 which immediately forwards the RRFS signal to the trunk scanner 89. When the trunk is then scanned by the trunk scanner, the scanning signal RTSD is applied directly to one input of AND gate G35, which also receives on its other two inputs the set output of flip-flop FF9 and reset output of flip-flop FF10. The gate G34 then forwards the register request signal RRSR to the trunk scanner 89.

Accordingly, it can be seen that the trunk circuit upon being seized from the outside world will immediately generate a continuously register request signal RRFS, which is forwarded to the trunk scanner 89 register regardless of whether the trunk is presently being scanned by the trunk scanner. In this way, at the beginning of the next time slot generated by the system timer 94, only the register DPA requests will be scanned by the system timer to ensure that the trunk circuit will be quickly connected to a register to receive the dialed digits from the distance exchange. When the trunk scanner then marks the trunk which has generated the RRFS signal, a time slotted register request RRSR will be generated and immediately forwarded to the trunk scanner for stopping the scanner and initiating the connection operation.

The RTSD signal which is received from the trunk is also applied to one input of gate G40 which receives at the other input thereof the signal $\overline{SL}$ indicating that the sleeve has not yet been connected. The output of gate G40 is applied through gate G41 to generate the signal MKO which extends to the transistor Q5 in FIG. 9 to drive the MKO relay. Contacts of the MKO relay are found in the mark lead MK in FIG. 6 extending to the operator service link network OSLN so that operation of the MKO relay serves to connect mark battery to the mark lead to the OSLN to initiate the path-finding operation therethrough to an available register. When ground is returned through the OSLN to the mark lead MK to operate the MD relay, this will place a ground through contacts of the MD relay on a line MD in FIG. 6. The next step in the process of connecting the trunk circuit through the operator service link network to an available register will be a checking of the tip and ring leads to ensure that a connection has been established. The ground on lead MD is applied to an input of the gate G24 in FIG. 11 to prevent enabling of this gate at the time the tip and ring leads are checked from the operator service link network, since at that time a CB signal will be received from the core sensor to go along with the AB signal already present at the input of the gate G24. Thus, during the checking operation, the gate G24 could be enabled falsely indicating answer supervision from the ESC. Operation of the MD relay serves to pervent this from happening by blocking the gate G24.

When it has been determined that battery and ground are received on the tip and ring leads from the trunk circuit through the operator service link network to an available register, ground will be placed on the sleeve lead through the OSLN and will appear on lead SLO in FIG. 6 to operate the SL relay. At the same time, ground will be removed from the mark lead MK in FIG. 6 which disables the MD relay. Since the sleeve relay SL is now operated, ground will be applied to the lead SL connected to gate G40 in FIG. 11 which disables the gate and thereby inhibits the MKO signal and releases the MKO relay.

Once the trunk circuit is connected through the OSLN to an available dial pulse acceptor DPA, the flip-flops FF9 and FF10 in FIG. 11 will be switched to the neutral condition with flip-flop FF9 reset and flip-flop FF10 set in a counter type operation. This is accomplished when ground is received on the sleeve lead SLO to operate the sleeve relay SL, which places ground on the SL lead in FIG. 11 through the gate G50 to set flip-flop FF12 which in turn is reset by the next time slot TS3 received from the system timer 94. The set output of flip-flop FF12 will be applied through the gate G51 to reset flip-flop FF9. The resetting of flip-flop FF9 will cause the set input of flip-flop FF10 to go high thereby setting this flip-flop. With flip-flop FF10 set, the trunk is ready to service a request for operator or for a transfer circuit, once FF9 is set again, as will be described in greater detail hereinafter.

At the time the SL relay is operated due to ground being applied on lead SLO from the OSLN, the ground on lead SL from FIG. 6 will be applied through G17 in FIG. 4 to disable the gate G15 providing the extend drive signal EXT. This will disable the extend relay so as to split the transmission pair in the trunk circuit providing for connection of the outside world directly down through the OSLN to the available register. The side going to the trunk link network then merely remains open.

In summarizing the previous operation during which the trunk is seized from the outside world, the loop connection to the transmission pair from the outside world generated an answer battery signal AB from the core sensor MCS2 in FIG. 8 which switches the trunk into its operation state by causing generation of the busy-enable signal BYE to operate all of the necessary relays to effect connection of the transmission pair from the outside world to the lines extending to the operator service link network. The AB signal also enables gate G30 initiating the request control circuitry in FIG. 11 to produce generation of a request mark RRSR to the trunk scanner indicating that a register is required. Upon receiving the register request, the trunk scanner will scan the trunks and stop at the trunk putting out the request signal thereby marking the trunk. At the other end of the OSLN a register is addressed by the PBX common control which places ground mark out to the OSLN. Link scanning through the OSLN takes place and eventually the mark from the register will be applied to the sleeve lead, releasing the extend relay EXT and thereby splitting the transmission path to provide connection of the outside world down through the OSLN to the register while leaving the transmission pair extending to the trunk link network open.

At the time the extend relay EXT is released, this condition will be monitored at the input of gate G60 in FIG. 4 on lead ET to provide an output through gate G60 to one input of the AND gate G62. Since we are receiving a sleeve mark from the OSLN, the $\overline{SL}$ input to gate G62 will enable the time slot TS5 to pass gate G66 to enable gate G62. This permits the LBE signal from the OSLN to pass from the output of gate G65 through gate G64 and AND gate G66 to provide the TLK signal. The signal TLK extends to FIG. 6 where it is forwarded on the LB lead to the OSLN as a constant indication that the trunk is associated with the connection to the OSLN. At each time slot 5 generated by the system timer 94, the PBX common control will check to see that the LB lead is enabled from the trunk circuit. If for any reason this lead is not found to be enabled during time slot 5, the PBX common control will immediately initiate a release sequence to release the trunk circuit.

The trunk is now set to receive the dialing impulses from the outside world, which impulses are followed by the RV1 relay in the loop trunk arrangement. Once the register has all the digits stored, it will call in the translator once again for further instructions concerning connection either to a subscriber or an operator. The ESC common control and the translator will then send out of the register common a switch signal which is placed upon the sleeve lead through the OSLN to the trunk circuit so as to operate the JC relay and the JCA relay and back through the JC relay to the junctor control. With operation of the JC relay and JCA relay, the trunk circuit will be associated with the junctor control to provide for connection of the tip and ring leads.

The JCA relay operates immediately through closed contacts of the JC relay so that leads TRC, JFS, MST, BSY, MRK, SLV, T and R are connected to the junctor control through closed contacts of these relays.

The junctor control will first send a mark ground signal MRK into the TLN through the trunk indicating that the trunk is being marked. The common control at the same time employs the line marker which will find the appropriate line and then initiate path-finding in the ESC between the trunk and the trunk link network ringing control element. The junctor control will check to see that the path to tip and ring is now complete and when checking is completed will send out an SLV signal to the trunk circuit which is received in FIG. 7. The mark on lead SLV passes through the closed contacts of the JC relay and is sent out on lead SJ to FIG. 6 where it operates the CO relay indicating that the trunk is connected to the trunk link network. The mark also extends back to the trunk control on lead SJ indicating that connection has been made. The CO relay holds itself via its own closed contacts by the ground applied to lead RD1R through the closed contacts of the operated REL relay since the RD1 relay is operated. Now the trunk circuit is holding the path through the trunk link network and at the same time the common control in the ESC is marking the desired line circuit to effect connection through the line link network and establish connection to the subscriber.

The trunk circuit has now received an incoming call from the outside world OSW, the incoming call to the trunk circuit has been connected to an available register through the OSLN, the trunk circuit has been switched through to the trunk link network under control of the junctor control and has now been connected to a subscriber circuit. Ringing is applied to the subscriber circuit from the ringing control which is in series with the trunk circuit and the selected line circuit. The flash control and time-out circuit illustrated at FIG. 10 provides a timing function to initiate a release sequence if the called party does not answer after a given period of time. A timing signal TOP is received at the input of gate G61 having a frequency coordinated to the timing desired. At a second input of the gate G61 there is received the signal $\overline{EFC}$ indicating that flip-flop FF11 in FIG. 11 has not been set and therefore answer superivsion has not been received. The output of gate G61 is applied to OR gate G62 which drives the counter TOC. Once the counter has counted up to nine, it will on the next clock signal set the first flash control flip-flop FF15 via gates G63 and G64 and also produce an output FDB at gate G65. The signal FDB is applied to the release ESC flip-flop FF5 in FIG. 4 to set this flip-flop and thereby disable the gate G5 so as to remove the drive signal HPD causing release of the HP relay in FIG. 9. The contacts of the HP relay are in the transmission pair so that the first thing that is done in the release sequence is to open up the tip and ring leads. With the HP relay released, the gate G11 is no longer enabled, thereby disabling gate G4 to remove the drive signal RELD causing the REL relay to release. This removes ground from the sleeve lead to the ESC and thereby causing the CO relay to release with removal of its holding ground. When the CO relay released, +5V is applied through gate G166 in FIG. 4 to reset the release ESC flip-flop FF5. The trunk circuit now remains connected to the outside world but has been disconnected from the ESC portion of the system.

At the same time that the signal FDB is generated at the output of gate G65 in FIG. 10, a parallel signal FDA also appears at the output of gate G67. This signal FDA is applied to the request control circuitry in FIG. 11 at an input of OR gate G32 which serves to trigger the request control flip-flop FF9. As might be recalled, when the register request was generated, flip-flop FF9 was in the set condition and flip-flop FF10 was in the reset condition. Subsequently, the flip-flop FF9 was reset which effected a setting of the flip-flop FF10 to remove the register request signal once the trunk was acquired. Thus, the signal FDA applied through gate G32 will set the flip-flop FF9 leaving both flip-flops FF9 and FF10 in the set condition. In this state, the trunk circuit will generate a general request for servive signal GRFS, or a QRFS signal if a queue is provided in the system. This is accomplished as a result of the setting of gate G36 by the set conditions of flip-flops FF9 and FF10 along with the indication of a sleeve connection on lead $\overline{SL}$. The output from gate G36 is applied through gate G37 to an input of AND gate G71 which is enabled since the NXCOS lead is of the proper potential in view of the no transfer condition of the operation. The output of gate G71 is applied through gate G72 to one input of gate G70 and an input of gate G75. If a queue is provided in the system, an input will be provided on the QIN lead through gate G73 directly to gate G75 and through gate G74 to gate G70, thereby enabling gate G75 and disabling gate G70. When the trunk scanner scans the trunk by application of the RTSD signal, one of the gates G70 or G75 will be enabled to produce either a GRFS or a QRFS signal back to the trunk scanner or the queue. These signals will eventually be recognized in the PBX common control as an operator request, stopping the trunk scanner on this particular trunk circuit. The PBX common control then initiates the procedure for connecting an available operator position circuit through an available loop and the OSLN to the trunk circuit.

As indciated for connection of the trunk circuit through the OSLN to a register, the RTSD signal received from the trunk scanner enables gates G40 and G41 to provide the MKO drive signal out to operate MKO relay in FIG. 9 via the drive transistor Q5, thereby initiating the marking down through the OSLN on the MK lead in FIG. 6 so that the MD relay will be operated upon completion of the mark path to disable gate G24 in FIG. 11 preventing false answer supervision. Once a path has been selected through the OSLN, a mark is applied to the SLO lead from the OSLN in FIG. 6 to operate the SL relay, which turns off the MKO relay. When the sleeve comes up, the trunk will then drop its extend relay EXT in the same way as described in connection with the acquisition of a register through the OSLN.

Looking now to FIG. 4, the gate G80 will be enabled by the ABE signal indicating that we have an incoming call to the loop where the source is at the outside world and have no answer supervision at the time of receipt of time slot 9 through gate G85. The output of gate G80 is applied through OR gate G82 and gate G83 to generate the signal MDL. Where the trunk is performing a recall operation to the operator, a gate G81 will be operated in response to receipt of a signal FD from the time-out circuit in FIG. 10 at time slot 8 thereby also generating the MDL signal through OR gate G82 and gate G83. In either case, we are attempting to connect from the trunk circuit to an available operator position. As seen in FIG. 6, the MDL lead extends through a contact of the MD relay, which is operated during marking through the OSLN. The lead MDL extends to an output MDB connected to a data bus extending to the PBX common control which then can determine whether the operation relates to recall or an extension of an incoming call to the operator by monitoring receipt of either time slot 8 or time slot 9 on the data bus.

In the case of loop requests, ring-back tone is provided from the trunk circuit to the outside world. At the time the busy-enable signal BYE is generated by setting of the flip-flop FF2 in FIG. 5, the ring-back tone flip-flop FF11 in FIG. 11 will be set providing an enabling output directly to one input of gate G90 and a second output through gate G91 to a second input of gate G90. If the trunk is operating on a loop request, gate G71 will be enabled, providing an output through gate G72 to set the loop request flip-flop FF16. The setting of flip-flop FF16 provides the third enabling input to gate G90, which then generates the signal RBTR to operate the RBT relay in FIG. 9. As seen in FIG. 6, the RBT relay has contacts in the line RBT extending from a ring-back tone signaler to the ring lead R1 extending back toward the outside world.

If the call is being extended to an operator position, the operator answers by pressing an answer loop kay at the attendant console with the result that the loop will send out a time slot 4 which is received through gate G95 in FIG. 4 and is applied to one input of gate G96. A second input of gate G96 receives the LBE signal from the OSLN via gates G65, G64, G66, G92, G93 and G94. With gate G96 enabled, an output RBTD is generated and applied in FIG. 11 to rest the flip-flop FF11. This will disable gate G90 and release the RBT relay to remove ring-back tone from the ring lead R1. On the other hand, for a direct inward dialed call, answer supervision is provided by enabling of gate G24 in FIG. 11 when the calling battery signal CB is generated thereby providing an output through gate G24 and gate G26 to set the flip-flop FF11.

Where the call has been extended down and answered by the operator, the operator can further extend the call in the same way that a register extends the call by hitting a start key on the attendant console to manually seize a register. She will then get dial tone from the register and associate the register backward to her loop circuit onto her position circuit. The operator then keys-in the digits of the party to be connected to the outside world and the normal ESC function takes place. Eventually, the register connected to the operator loop circuit will send a switch-through signal through the position circuit and the loop circuit on the sleeve lead through the OSLN to operate the JC relay in FIG. 7 in the manner already described. When the inside subscriber answers, ring trip will be detected in the operator loop circuit and the loop circuit will then forward a time slot 9 signal to the trunk which is received through gate G85 in FIG. 4 at one input of AND gate G97. The gate is enabled at the other input by the LBE signal received from the output of gate G94 and will thereby set the release OSLN flip-flop FF6. The first thing which occurs upon operation of relay FF6 is the enabling of gate G15 to generate the drive signal to operate the extend relay EXT in FIG. 9. This is to ensure that the outside world will be connected to the inside subscriber before the OSLN releases, or else the two parties might be inadvertently dropped. With operation of the extend relay, the gate G62 in FIG. 4 is disabled thereby inhibiting application of the time slot 5 signal through gates G64 and G66 to the line TLK. Thus, the time slot TS5 signal will not be applied from line TLK to the LB lead extending to the OSLN as required to maintain the connection with the OSLN. The OSLN control 58 will theninitiate a release sequence which disconnects the PBX portion of the system from the trunk.

When the outside world dials the listed director number of the system, the call is to be extended to the operator; however, until the dialed digits can be analyzed by the number and code translator 46, the system cannot determine whether the call is a direct inward dialed call or a listed director number call. Accordingly, when the outside world seizes the trunk circuit, the trunk will be connected through the operator service link network 68 and an available dial pulse acceptor 70 to an available incoming register 38, in the manner already described. When the dialed digits have been received by the incoming register 38 and analyzed by the number and code translator 46, the translator will signal the PBX–ESC interface via line 45 to enable the LDN bus indicating that a listed director number has been dialed.

The enabling of the LDN lead to the trunks will be detected at the input of gate G98 in FIG. 11. The face that the junctor port of the trunk, i.e., that the leads TA and RA in FIG. 6 are not connected through the contacts of the JC relay on lines T and R to the trunk link network, is detected by gate G99. These conditions enable the setting of flip-flop FF13. The sleeve mark is removed by the automatic release of the dial pulse acceptor upon detection of the listed directory number to set flip-flop FF9. Since the flip-flops FF9 and FF10 were in the neutral state with flip-flop FF9 reset and flip-flop FF10 set by the previous operation, the condition of the two flip-flops will now be FF9 set and FF10 set with no ground received on the sleeve lead SL, and gate G36 will be enabled causing enabling of one input of the AND gate G101 via gate G37. An input of the gate G70 is also enabled via gates G71 and G72 from the output of gate G37 and an input of gate G75 is also enabled from the output of gate G72. Thus, as described previously, depending upon whether the system includes a queue and depending upon the transfer class of service indication received on line NXCOS, one of gates G75, G70 or G101 will be enabled. Since no connection has been made to a subscriber, the NXCOS input will not indicate a transfer class of service, so that gate G101 cannot be enabled to provide an XRFS request for transfer. Thus, if the QIN input via gate G73 indicates that the system includes a queue, gate G75 will be enabled to put out a request for operator QRFS to the queue, and if QIN indicates that no queue is included in the system the output of gate G73 via gate G74 will enable gate G70 to put out a general request for operator GRFS to the trunk scanner. Once the operator is connected to the trunk, she can respond to the call and extend it to inside parties as already discussed.

The trunk circuit also is involved in a transfer operation by which the outside world can be transferred from one subscriber to another within the system, either by a subscriber or the operator. Where an inside party having the proper class of service is talking to the outside world, the inside party can transfer the call to another subscriber within the system by flashing his hook switch. When an inside party hangs up or flashes a hook switch, it means that he goes temporarily on hook for more than a dial pulse. Thus, if the on-hook condition persists for more than 180 milliseconds but less than an arbitrary time, such as 1.8 seconds, which would indicate that the party has hung up, then the condition represents a hook flash.

If a party temporarily goes on hook, it will be recognized through the transmission pair at the core sensor MCS1 in FIG. 8 from which the the calling battery signal CB will react by going high (+5V). This condition is monitored by the flash control and time-out circuit in FIG. 10 via OR gate G105 to enable the clear direct input of the counter TOC. Thus, the counter will start running in response to the SCR 20 millisecond timing pulses received via gate G106 and gate G62. When the counter TOC reaches a count of nine, the first flash flip-flop FF15 is set via gates G63 and G64. The set output of flip-flop FF15 is applied to one input of a gate G108, which receives at another input thereof a 200 millisecond timing signal. The timing signal from gate G108 is applied through OR gate G62 to drive the counter TOC. The reset output of flip-flop FF15 is at the same time connected back to gate G106 to inhibit the gate thereby preventing the application of the SCR 20 millisecond signal to the counter TOC. Thus, the first counting sequence resulted in a count of 180 milliseconds in response to application of 20 millisecond pulses to the counter TOC, at the end of which the flip-flop FF15 is set. The second counting sequence is based upon the application of 200 millisecond pulses to the counter TOC to count out a periof of 1.8 seconds. If an off-hook condition is detected once again during the second counting period, then it can be determined that the condition was a hook flash. However, if the counter TOC reaches a count of nine during the second counting period without the off-hook condition being detected, it will be determined that the condition is cuased by the party hanging up. In the latter case, the first flip-flop FF15 will be reset from the output of gate G64 and the second flip-flop FF16 will be set providing an output CBR from the gate G110 indicating calling battery release.

Assuming that only the first flip-flop FF15 in the flash control and time-out circuit is set at the time an off-hook condition is once again detected on the CB lead, the gate G112 will be enabled by the set output of flip-flop FF15, the calling battery signal CB, the EFC output of flip-flop FF11 in FIG. 11 and the signal RE indicating that the circuit is not in a release mode. With these four conditions, gate G112 will provide an output FDA via gate G113 to enable OR gate G32 in FIG. 11. The output of OR gate G32 will set the first request control flip-flop FF9 so that both flip-flops FF9 and FF10 are now set. As indicated previously, under these conditions, an output from gate G36 via gate G37 will permit enabling of gates G75, G70, or G101 depending upon the transfer class of service information received on input NXCOS via gates G71 and G102.

As seen in FIG. 10, whenever connection is made to a subscriber line circuit, the class of service data associated with that line circuit will be transferred from the ESC portion of the system to the ESC–PBX interface and store 66, which then enables the NX bus to the trunks indicating the transfer class of servide for the particular line circuit. This class of service is stored in the trunk in the class of service flip-flop FF18. If the party has a transfer class of service, the lead NXDB to gate G121 will be enabled thereby enabling gate G122 to set the flip-flop FF18. The output NXCOS from flip-flop FF18 is applied to the gates G71 and G102 in FIG. 11 to determine whether a transfer request XRFS is to be generated from the trunk or whether, in response to an attempt at transfer by a party not having the proper class of service, a general request GRFS or a QRFS request should be generated to obtain the operator. In this way, even a transfer request by a party not having the proper class of service is not ignored, but is converted by the trunk circuit to a request for the operator. If the party has a transfer class of service, the PBX common control will effect a connection of the trunk through the OSLN to an available transfer circuit in response to generation of the XFRS signal, and upon connection of the transfer circuit to the trunk circuit through the OSLN, the holding ground on the sleeve lead will be applied to gate G125 in the flash control and time-out circuit to stop the counter TOC and clamp it so that it cannot be set again so long as the transfer circuit is connected to the trunk circuit. The transfer circuit will now detect future flashes and the other requests previously handled by the trunk circuit.

When an inside subscriber has acquired a register via a transfer circuit by flashing his switch hook, he may be connected to another inside subscriber by dialing the digits identifying that subscriber's number, or he may dial zero and acquire the services of the operator to effect connection to the other subscriber. As already indicated, the extend relay EXT is released so that the original inside subscriber and the outside world are split with the inside subscriber being connected via the transmission pair through the OSLN to the transfer circuit. If the inside subscriber dials zero, the number and code translator 46 decodes this digit and signals the ESC–PBX interface and store 66 via line 45 to generate a DOX signal indicating that the operator has been dialed on a transfer call. In response, the transfer circuit will send a time slot 6 through the OSLN into the trunk where it is received at gate G120 in FIG. 4. As a result, gate G121 will be enabled by time slot 6 and the LBE signal applied from gate G94 to generate a DOX signal which is forwarded to an input of OR gate G32 in FIG. 11. As described above in connection with a listed director number call, enabling of gate G32 will set flip-flop FF9 to inititate a request control operation which will generate a GRFS or QRFS signal requesting connection to the operator through the OSLN. Once an operator has been connected to the inside subscriber who has initiated the transfer operation, the operation can call up a register and dial the number of a second subscriber at the request of the original subscriber to effect connection of that subscriber through the trunk circuit to the existing connection. The operator will then release effecting operation of the extend relay in the trunk to connect the three parties who may remain on a three-way connection. The original inside subscriber may also release at this time leaving the second inside subscriber connected to the outside world.

After a transfer operation which has been initiated and completed by the subscriber without the aid of the operator and the original inside party hangs up, the outside world is connected to the second inside subscriber through the trunk circuit, OSLN, transfer circuit, transfer common, transfer line circuit, line link network, trunk link network and back through the line link network to the subscriber line circuit. As soon as the original inside party hangs up, the calling battery signal CB disappears, which condition is recognized in the transfer circuit. The transfer circuit then forwards a time slot 7 up to the trunk which is received at gate G122 in FIG. 4. This will result in enabling of gate G123 by the time slot 7 and LBE signal received from the output of gate G94, and the output of gate G123 will set the release ESC flip-flop FF5 to effect a release of the connection to the trunk link network in the same manner as described above in connection with generation of the signal FDB by the flah control and time-out circuit. With flip-flop FF5 set, the HP relay will release allowing the REL relay also to release, thereby disconnecting the original inside party from the trunk circuit.

What is claimed is:

1. A trunk circuit for effecting both internal and outgoing connections in a private branch telephone exchange including a trunk link network interfacing said trunk circuit with a plurality of subscriber line circuits, an operator service link network interfacing said line circuit with a plurality of operator position circuits, a plurality of registers and a trunk marker-scanner system, said trunk circuit comprising a voice transmission path including an originating direct current loop for connection between said trunk link network and a voice bridge circuit as well as said operator service link netork, relay circuit means having contacts in said voice transmission path for controlling connection of said bridge circuit to said trunk link network and said operator service link network and terminating circuit means connecting said voice bridge circuit to an outgoing trunk line for providing a plurality of selective interface combinations with a distant telephone system connected to the outgoing trunk line.

2. A trunk circuit as defined in claim 1 wherein said terminating circuit means includes a direct current loop circuit and an E and M circuit, and connection means for selectively connecting said direct current loop circuit or said E and M circuit to the outgoing trunk line side of said bridge circuit.

3. A trunk circuit as defined in claim 1 wherein said terminating circuit means includes a combination two-way circuit arrangement responsive to ground start ring and an E and M circuit, and connection means for selectively connecting said direct current loop circuit or said E and M circuit to the outgoing trunk line side of said bridge circuit.

4. A trunk circuit as defined in claim 1 wherein said terminating circuit means includes connection means for selectively connecting one of said interface combinations to the outgoing trunk line side of said bridge circuit.

5. A trunk circuit as defined in claim 4 wherein said connection means comprises a plurality of terminal connections extening among the various components of said plurality of interface combinations, which terminal connections may be selectively bridged to produce various interface terminations on said outgoing trunk line.

6. A trunk circuit as defined in claim 1 wherein said relay circuit means includes a single normally operated busy relay having closed contacts in a mark path to said trunk marker-scanner system, a first group of normally released relays energized by seizure of said trunk circuit from said trunk marker-scanner system to place the trunk in a standby condition, and a second set of normally released relays responsive to operational commands received on said transmission path to place the trunk circuit in an operative condition.

7. A trunk circuit as defined in claim 6 wherein said first group of normally released relays includes a mark relay actuated by said marker-scanner system over said mark path, said trunk circuit further including busy-enable means responsive to operation of said mark relay for sequentially enabling the remainder of said first group of normally released relays and releasing said busy relay to prevent further seizure of the trunk circuit.

8. A trunk circuit as defined in claim 7 wherein said remainder of said first group of normally released relays includes a current switching relay having contacts in said transmission path and a holding relay operative through contacts of said current switching relay to provide a holding ground to said trunk link network.

9. a trunk circuit as defined in claim 8 wherein said terminating circuit means includes connection means for selectively connecting one of said interface combinations to the outgoing trunk line side of said bridge circuit.

10. A trunk circuit as defined in claim 9 wherein said connection means comprises a plurality of terminal connections extending between the various components of said plurality of interface combinations, which terminal connections may be selectively bridged to produce various interface terminations on said outgoing trunk line.

11. In an automatic telephone exchange including a trunk link network, a plurality of line circuits and a common control, a trunk circuit for connecting outgoing trunk lines to said line circuits through said trunk link network under control of said common control comprising a voice transmission path including an originating direct current loop for connection between said trunk link network and a voice bridge circuit, relay circuit means having contacts in said voice transmission path for controlling connection of said bridge circuit to said trunk link network, a plurality of circuit components capable of selective connection into a plurality of different interface combinations for connection to various exchange equipment on the outgoing trunk side of said voice bridge circuit, and connection means for selectively connecting various ones of said circuit components to form a single interface combination connected to said voice bridge circuit.

12. A trunk circuit as defined in claim 11 wherein said connection means comprises a plurality of terminal connections extending between various ones of said circuit components, which terminal connections may be selectively bridged by prewired combinations to produce various interface terminations on said outgoing trunk line.

13. A trunk circuit as defined in claim 12 wherein said interfac terminations include a direct current loop circuit, a combination two-way circuit arrangement responsive to ground start ring and an E and M signaling circuit.

14. A trunk circuit as defined in claim 13 wherein said relay circuit means includes a single normally operated busy relay having closed contacts in a mark path to said trunk marker-scanner system, a first group of normally released relays energized by seizure of said trunk circuit from said trunk marker-scanner system to place the trunk in a standby condition, and a second group of noarmlly released relays responsive to operational commands received on said transmission path to place the trunk circuit in an operative condition.

15. A trunk circuit as defined in claim 14 wherein said first group of normally released relays includes a mark relay actuated by said marker-scanner system over said mark path, said trunk circuit further including busy-enable means responsive to operation of said mark relay for sequentially enabling the remainder of said first group of normally released relays and releasing said busy relay to prevent further seizure of the trunk circuit.

* * * * *